(12) United States Patent
Sosna et al.

(10) Patent No.: US 12,547,364 B1
(45) Date of Patent: Feb. 10, 2026

(54) SYSTEMS AND METHODS FOR VIRTUAL CURSOR FACILITATING INTERACTIVE DELIVERY OF CONTROLLED CONTENT

(71) Applicant: Veeva Systems Inc., Pleasanton, CA (US)

(72) Inventors: Arno Sosna, Pleasanton, CA (US); Dmitriy Reznikov, Danville, CA (US); Aung Moe, South San Francisco, CA (US); Sivaram Vanka, San Ramon, CA (US)

(73) Assignee: Veeva Systems Inc., Pleasanton, CA (US)

(*) Notice: Subject to any disclaimer, the term of this patent is extended or adjusted under 35 U.S.C. 154(b) by 323 days.

(21) Appl. No.: 18/471,367

(22) Filed: Sep. 21, 2023

Related U.S. Application Data

(60) Provisional application No. 63/519,190, filed on Aug. 11, 2023.

(51) Int. Cl.
*G06F 3/14* (2006.01)
*G06F 3/04812* (2022.01)

(52) U.S. Cl.
CPC ........ *G06F 3/1454* (2013.01); *G06F 3/04812* (2013.01); *G06F 2203/04803* (2013.01)

(58) Field of Classification Search
CPC .... G06F 3/1454; G06F 3/04812; G06F 3/048; G06F 2203/04803
See application file for complete search history.

(56) References Cited

U.S. PATENT DOCUMENTS

| | | | |
|---|---|---|---|
| 10,001,913 B2* | 6/2018 | von Muhlen | H04L 65/1069 |
| 2014/0019858 A1* | 1/2014 | McAllister | G09G 5/026 |
| | | | 715/273 |
| 2014/0173442 A1* | 6/2014 | Yu | G06F 3/04845 |
| | | | 715/730 |
| 2015/0113411 A1* | 4/2015 | Underwood | G06F 3/1423 |
| | | | 715/730 |
| 2020/0293261 A1* | 9/2020 | Janamanchi | H04L 12/1831 |
| 2024/0184414 A1* | 6/2024 | Liu | G06F 9/452 |

* cited by examiner

*Primary Examiner* — Jeanette J Parker

(57) ABSTRACT

Systems and methods for virtual cursor facilitating delivery of interactive approved content. An attendee view window is established that displays a user selected interactive approved content. A presenter view window is also established that mirrors the user selected interactive approved content and includes additional tools to facilitate effective delivery of the demonstration. Both windows are overlapped such that when a virtual cursor is enabled the attendee view window is calibrated to the foreground, the presenter view window is calibrated to the background, and the principal cursor is concealed. An attendee view cursor movement is tracked to provide cursor position synchronization between the attendee view cursor and virtual cursor.

19 Claims, 19 Drawing Sheets

SYSTEMS AND METHODS FOR VIRTUAL CURSOR FACILITATING INTERACTIVE DELIVERY OF CONTROLLED CONTENT

CROSS-REFERENCE TO RELATED APPLICATIONS

The present application is a continuation application of U.S. Provisional Patent Application No. 63/519,190, filed on Aug. 11, 2023, entitled Systems and Methods for Virtual Cursor Facilitating Interactive Delivery of Controlled Content, which is hereby incorporated by reference herein for all purposes.

TECHNICAL FIELD

The present disclosure relates generally to systems and methods that provide for interactively delivering controlled content to electronic communications recipients.

BACKGROUND

The distribution and promotion of marketed products in the life sciences industry is strictly monitored and regulated. Large fines have been levied against top pharmaceutical companies for infractions of off-label messages and promotion. For instance, only approved uses of a drug are allowed to be promoted. Similarly, the distribution of drug samples is heavily monitored by the FDA and DEA. There is a need to comply and adhere to strict industry rules and regulations. As such, there is a focus on ensuring only approved content is sent to health care providers, or "HCPs". Commercial content needs to be regulated in a controlled manner so that only approved versions with sanctioned information are distributed.

The current method of delivery of controlled approved content needs to be improved to assist the presenters (e.g. pharmaceutical representatives) in distributing only sanctioned information. For instance, presenters sharing approved content lack the ability to reference slide notes, and preview next slides, while the attendee (e.g., health care providers, or HCPs) only views the current slide. Allowing the presenters easy access to the necessary context and additional notes ensures sanctioned messaging, smooth transitions and a complete presentation. There is a need to provide additional tools to the presenters to ensure on-label demonstrations and an effective delivery of controlled approved content.

SUMMARY OF THE INVENTION

The above problems are addressed and other advantages are realized by the methods and systems of the present disclosure that provide presenters (e.g., pharmaceutical representatives, and the like) the ability to share and facilitate the delivery of interactive approved content with attendee users (e.g., health care providers).

Embodiments disclosed in the present document provide a machine-implemented method for virtual cursor facilitating delivery of interactive approved content in a content delivery system. The machine-implemented method comprises: establishing an attendee view window, wherein the attendee view window displays what is presented to an attendee including a presenter selected interactive approved content; establishing a presenter view window, wherein the presenter view window displays what is visible to the presenter only and includes additional tools to facilitate effective delivery of interactive approved content; overlapping the attendee view window and presenter view window with a compositing window manager that retains a first source resolution and a first frame rate; mirroring in real-time the presenter selected interactive approved content displayed in the attendee view window onto an area of the presenter view window such that approved content rendering updates are reflected in the area of the presenter view window; enabling a virtual cursor mode and displaying a virtual cursor on the presenter view window at a virtual cursor position, wherein the virtual cursor position corresponds to a position of an attendee view cursor within the attendee view window; and designating the attendee view window as an active element and concealing a principal cursor.

Embodiments disclosed in the present document provide a system for virtual cursor facilitating delivery of interactive approved content. The system comprises: a content delivery server including a processor, the processor performing the steps of: establishing an attendee view window, wherein the attendee view window displays what is presented to the attendee including a presenter selected interactive approved content; establishing a presenter view window, wherein the presenter view window displays what is visible to the presenter only and includes additional tools to facilitate effective delivery of interactive approved content; overlapping the attendee view window and presenter view window with a compositing window manager that retains a first source resolution and a first frame rate; mirroring in real-time the presenter selected interactive approved content displayed in the attendee view window onto an area of the presenter view window such that approved content rendering updates are reflected in the area of the presenter view window; enabling a virtual cursor mode and displaying a virtual cursor on the presenter view window in a virtual cursor position, wherein the virtual cursor position corresponds to a position of an attendee view cursor within the attendee view window; and designating the attendee view window as an active element, and concealing a principal cursor.

BRIEF DESCRIPTION OF THE DRAWINGS

For a more complete understanding of the present application and its advantages, references are now made to the following description taken in conjunction with the accompanying drawings, in which like reference numbers indicate like features.

FIG. 6C illustrates side-by-side screenshots showing both presenter view and attendee view displays when engaging with the interactive presentation during delivery of approved content in accordance with some embodiments.

FIG. 7C illustrates additional side-by-side screenshots showing both presenter view and attendee view displays when engaging with the interactive presentation during delivery of approved content in accordance with some embodiments.

FIG. 11A illustrates additional side-by-side screenshots showing both presenter view and attendee view displays when engaging with the presentation during delivery of approved content including interactive documents in accordance with some embodiments.

Although similar reference numbers may be used to refer to similar elements for convenience, it can be appreciated that each of the various example embodiments may be considered to be distinct variations.

Figure 1:
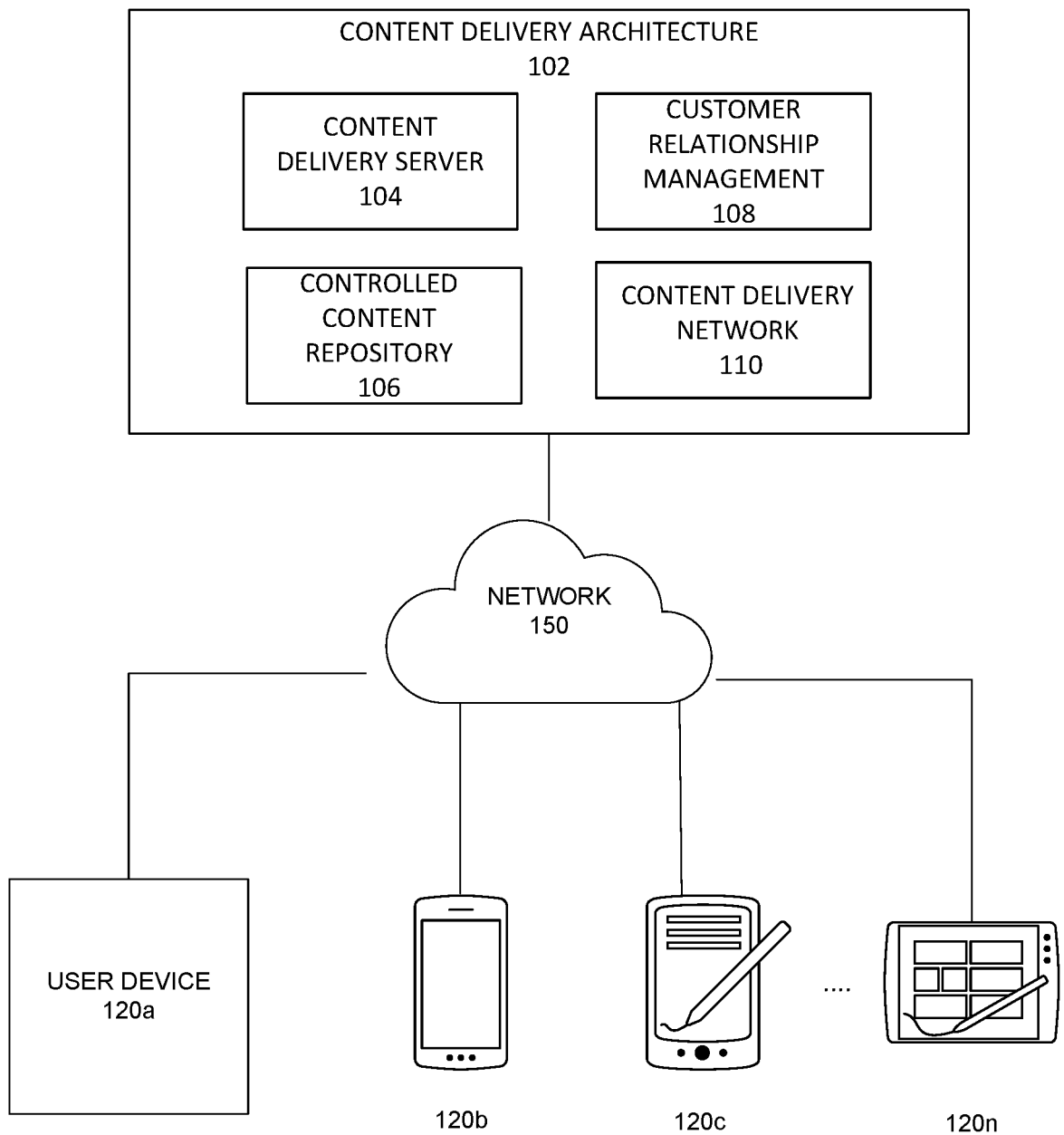
FIG. 1 is a system overview illustrating an embodiment of a remote delivery system of controlled content 100.

The present embodiments will now be described hereinafter with reference to the accompanying drawings, which form a part hereof, and which illustrate example embodiments which may be practiced. As used in the disclosures and the appended claims, the terms "embodiment" and "example embodiment" do not necessarily refer to a single embodiment, although it may, and various example embodiments may be readily combined and interchanged, without departing from the scope or spirit of the present embodiments. Furthermore, the terminology as used herein is for the purpose of describing example embodiments only, and are not intended to be limitations. In this respect, as used herein, the term "in" may include "in" and "on," and the terms "a", "an", and "the" may include singular and plural references. Furthermore, as used herein, the term "by" may also mean "from," depending on the context. Furthermore, as used herein, the term "if" may also mean "when" or "upon," depending on the context. Furthermore, as used herein, the words "and/or" may refer to and encompass any and all possible combinations of one or more of the associated list items.

DETAILED DESCRIPTION OF INVENTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, well-known structures and components are shown in block diagram form in order to avoid obscuring the concepts of the subject technology.

Interactive presentations of controlled approved content are more engaging and thus more effective conveying the intended message. Examples of interactive controlled approved content may include PDFs, HTML, and any dynamic content where attendees (e.g. health care professionals, or HCPs) can interact and input text, manipulate input control, combo boxes, etc. Involving the audience to participate in the presentations seizes the audience's attention and ensures they remain active during the demonstration. However, enabling the ability to interact with presentations introduces some challenges. In order to facilitate full control of interactive content, the presenter (e.g., pharmaceutical representative) needs access to both presenter view and attendee (e.g., HCP) view. There are instances where presenters need both the ability to control the attendee view and see the approved content details on the presenter view. Tracking and handling interaction with the approved content in both presenter and attendee views is a complex process. Furthermore, retaining high fidelity of the approved content is also an issue. Approved content presentations containing video slides require high source resolution and a high frame rate for proper display. There is a need to allow presenters (e.g., pharmaceutical representatives) to more readily engage and effectively deliver sanctioned presentations to attendees (e.g., HCPs).

Embodiments disclosed in the present application enable presenters and attendees to jointly engage in interactive approved content from a controlled content repository. The presenter (e.g, pharmaceutical representative) may be delivering approved content in a meeting with an attendee (e.g., HCP) face-to-face while at the visiting office using an additional computer monitor, or projector. In another implementation, the presenter may be delivering approved content remotely.

Delivery of approved content occurs in a system which has a repository of controlled content items and customer relationship management (CRM) information including customer profile information and parameters including customer preferences and regulatory limitations or fields that can be used to facilitate compliance with regulatory limitations. Various customer attributes such as regulatory limitations, customer preferences and demographic information are aligned with the approved content to ensure compliant and tailored communication.

In disclosed embodiments, intelligent and flexible updating of records may be provided within the customer relationship management subsystem, including such approaches as communicating with third-party systems and sources in order to verify and update customer information in an effective and timely manner, such as by using the collective information gained by managing a cloud-based system/Software-as-a-Service (SaaS) system on behalf of multiple company customers for the disclosed embodiments.

FIG. 1 is a system overview illustrating an embodiment of the architecture 100 for remote delivery of the approved content. The presently disclosed embodiment comprises a content delivery architecture 102, a network 150 and a plurality of user devices 120a . . . 120n. The content delivery architecture 102 comprises a content delivery server 104, a controlled content repository subsystem 106, a Customer Relationship Management (CRM) subsystem 108, and a global content delivery network (CDN) subsystem 110.

The network 150 may include one or more types of communication networks, e.g., a local area network ("LAN"), a wide area network ("WAN"), an intra-network, an inter-network (e.g., the Internet), a telecommunication network, and peer-to-peer networks (e.g., ad hoc peer-to-peer networks), which may be wired or wireless.

The user computing devices 120a-120n may be any machine or system that is used by a presenter or attendee user to access the content delivery server 104 via the network 150, and may be any commercially available computing devices including laptop computers, desktop computers, mobile phones, smart phones, tablet computers, netbooks, and personal digital assistants (PDAs). A client application 121 may run from a user computing device, e.g., 120a, and access the content delivery server 104 via the network 150. User computing devices 120a-120n are illustrated in more detail in FIG. 4.

Figure 2:
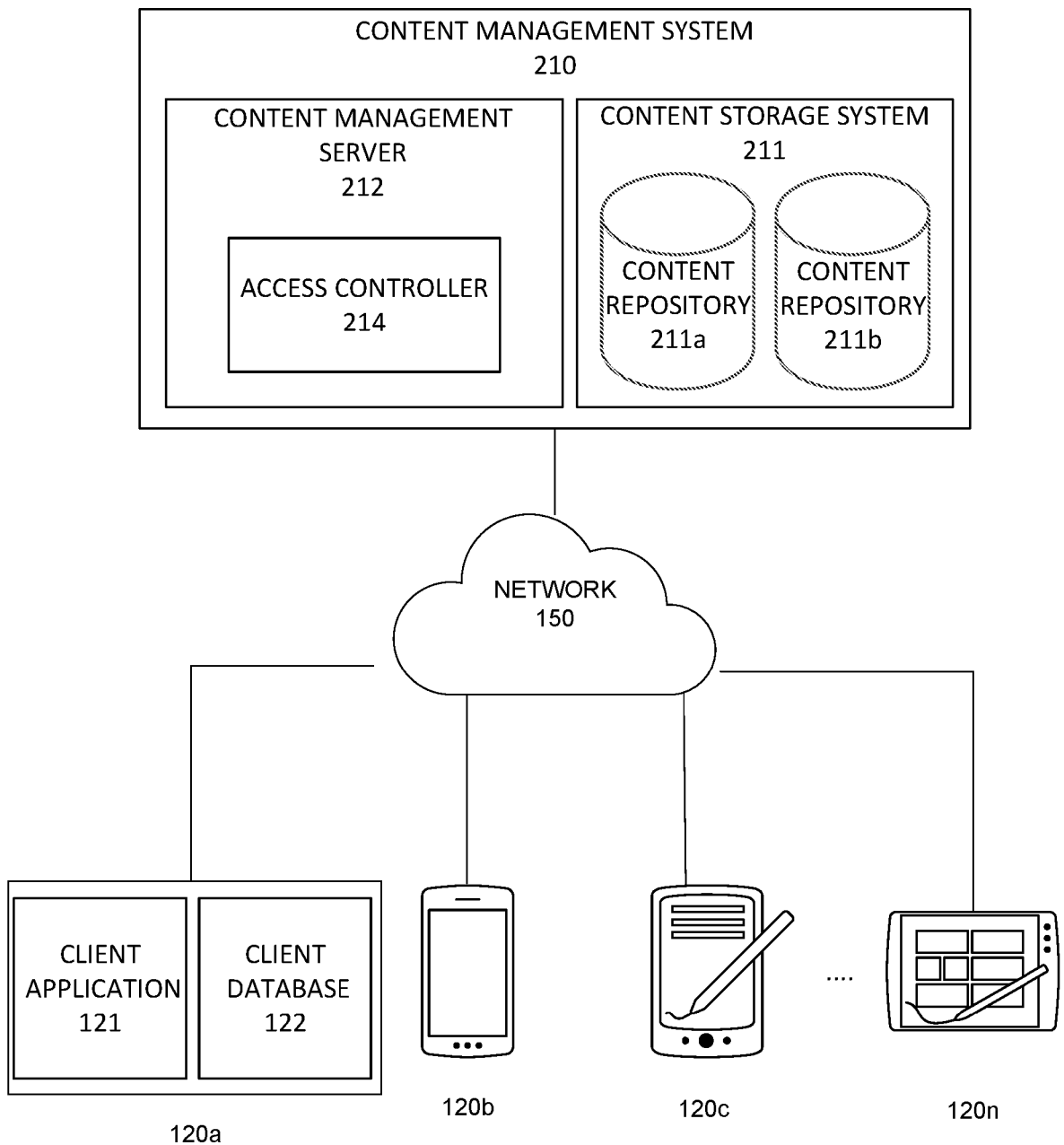
FIG. 2 illustrates an example architecture for the controlled content repository 106 of FIG. 1 in which content is built and organized in a controlled manner that facilitates efficient content generation.

In an embodiment, the controlled content repository 106 is a cloud-based or distributed network based system for consolidating an enterprise's data, oftentimes integrating multiple content repositories in an enterprise into a single system having coordinated control measuring, and auditing of data creation, access and distribution. FIG. 2 illustrates an example high level block diagram of an enterprise content management architecture 200 which can be used as a controlled content repository subsystem 106 wherein the present invention may be implemented. The enterprise may be a business, or an organization. As shown, the architecture 200 may include a content management system 210, and a plurality of user computing devices 120a, 120b, . . . 120n, coupled to each other via a network 150. The content management system 210 may include a content storage system 211 and a content management server 212. The content storage system 211 may have one or more content repositories, e.g., 211a and 211b. Each repository may store a specific category of content, be the source repository for its content, and allow users to interact with its content in a specific business context. In one implementation, 211a may be a repository with content published for normal closed loop marketing sessions whereas 211b may be a repository with content published for remote closed loop marketing sessions.

The content storage system 211 may store content that client applications (e.g., 121) in user computing devices 120a, 120b, . . . 120n may access and may be any commercially available storage devices. The content management server 212 is typically a remote computer system accessible over a remote or local network, such as the network 150. The content management server 212 may be any commercially available computing devices. The corresponding server process may be active on content management server 212. The client application process may communicate with each other over the network 150, thus providing distributed functionality and allowing multiple client applications to take advantage of the information-gathering capabilities of the content management system 210.

In one implementation, the content management server 212 may include a content access controller 214 which may control the process of providing and sharing content to the user devices. The controlled content repository 106 is designed to have a process for developing approved content that is sharable across multiple users, such as shareholders, reviewers, managers, marketing personnel, sales representatives, etc. The content generated in the controlled content repository 106 may be accessed on a regulated basis and displayed to both presenter and attendee user devices during an active session. In addition to storage and development of content, the controlled content repository may also store an audit trail, tracking exact content of communications as they were sent by the user, as well as metadata about the communications and information regarding the content accessed by customers.

To ensure the integrity and security of the controlled content repository 106, an access protocol is established. This access protocol may be defined by computer instructions stored in the computer readable memory, or executable code storage, such that access to the controlled content repository 106 is controlled in accordance with the principles described in the present application. The access protocol comprises at least one set of alignment rules for determining if a first item of approved content within the controlled content repository can be made available to participants (e.g., the presenter, attendee, or both).

In one implementation of the controlled content repository 106 for the life sciences industry, the repository 106 can include specific data collections for the following areas and/or business process-specific applications: Research and Development (R&D); clinical trials; manufacturing and quality; medical communications; marketing and sales.

Research and development applications may provide an aggregation of materials that support research and initial clinical trial submissions through building organized and controlled content repositories within the controlled content repository 106. Researchers, contract research organizations, and other collaboration partners can access and/or distribute content through a single controlled document interface. Examples of data that may be stored, organized and managed include: submission bills of materials, Drug Information Association (DIA) reference models support, and submission-ready renderings.

Clinical trials applications may provide faster and more organized access to trial documents and reports, while supporting seamless collaboration between sponsors, CROs, sites, investigators, and other trial participants. Specific features both ease study and site administration as well as support the DIA trial master file (TMF) reference model.

This enables efficient transfer of controlled content between subsequent phases of the life sciences development process.

Manufacturing and quality applications enable the creation, review, approval and distribution of controlled documents across the organization and with external partners in the context of materials control and other manufacturing elements. Watermarking, controlled print, signature manifestation, and "Read and Understood" signature capabilities are examples of features supported, thus managing the documents and metadata associated in the controlled content repository 106 such that related documents are not distributed in contravention of law and company policy.

Medical communications applications provide communications with medical facilities, including call center access, integration, and interface functionality. Particular access control features and metadata associated with this application include expiration and periodic review elements, multichannel support, global documents and automatic response package generation through the controlled content repository 106.

Marketing and sales applications provide an end-to-end solution for the development, approval, distribution, expiration and withdrawal of promotional materials. Specific features include support for global pieces, approved Form FDA 2253 (or similar international forms) form generation, online document, video annotation, and a build in digital asset library (DAL).

The customer relationship management (CRM) subsystem 108 contains all contact information that may be available to users. In addition to storage of contact information, the customer relationship management subsystem may also be capable of storing configurations regarding specific preferences, regulatory limitations and requirements, and other fields that will facilitate the delivery of optimized content to participants. These preferences and/or requirements include both the preferences of the participant (e.g., maintaining account lists) as well as the preferences of the enterprise (e.g., which communication apps are available for distribution of optimized content links), discussed in further detail below.

Figure 3:
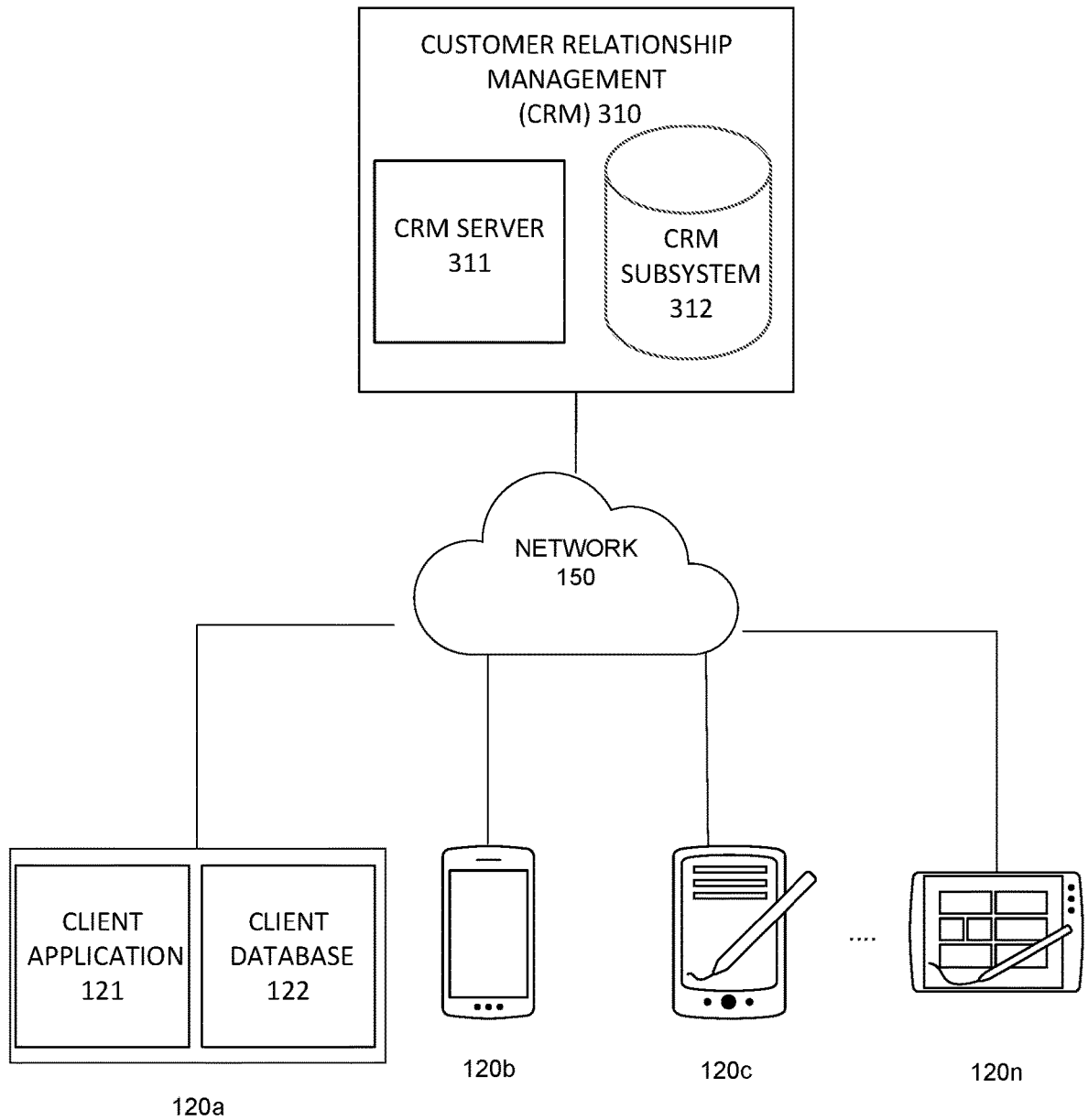
FIG. 3 illustrates an example architecture for the customer relationship management 108 of FIG. 1 in which contact information, preferences, and requirements is stored to facilitate the remote delivery of approved content in general or on a by-recipient basis.

FIG. 3 illustrates an example high level block diagram of a customer relationship management (CRM) architecture 300 which can be used as the customer relationship management subsystem 108 wherein the present invention may be implemented. As shown, the architecture 300 may include a plurality of user computing devices 120a, 120b, . . . 120n, and a CRM 310, coupled to each other via a network 150. The CRM 310 may include a customer relationship management server 311, and a customer relationship management subsystem 312.

The user computing devices 120a-120n may be any machine or system that is used by a user to access the CRM 310 via the network 150, and may be any commercially available computing devices including laptop computers, desktop computers, mobile phones, smart phones, tablet computers, netbooks, and personal digital assistants (PDAs). A client application 121 may run from a user computing device, e.g., 120a, and access the CRM 310 via the network 150. User computing devices 120a-120n are illustrated in more detail in FIG. 4.

The customer relationship management server 311 is typically a remote computer system accessible over a remote or local network, such as the network 150, and may provide access to the customer relationship management subsystem 312. The customer relationship management server 311 could be any commercially available computing devices. A client application (e.g., 121) process may be active on one or more user computing devices 120a-120n. The corresponding server process may be active on the customer relationship management server 311. The client application process and the corresponding server process may communicate with each other over the network 150, thus providing distributed functionality and allowing multiple client applications to take advantage of the information-gathering capabilities of the CRM 310.

In one implementation, the customer relationship management subsystem 312 contains all contact information that may be available to users. In addition to storage of contact information, the customer relationship management subsystem 312 may also be capable of storing configurations regarding specific preferences, regulatory limitations and requirements, and other fields that will facilitate communications, in general or on a by-recipient basis. The customer relationship management subsystem 312 may also store communication information, e.g., call reports which include parties of the calls, time of the calls, products discussed and other details about the calls.

In the pharmaceutical sales industry, pharmaceutical representatives are required to use call reports to record meetings and other interactions with health care providers. The call reports need to include the HCP's professional information, the medical products discussed, the materials shown to the HCPs, the samples left, etc. The generated call report records the nature of the interaction, whom the interaction was with, what content was presented, how the content was presented and associates the record with an account. Typical fields recorded in a call report include: Account, Date/Time, Record Type, Location, Sample Requests, also known as Business Reply Cards (BRCs). BRCs enable users to create sample orders on behalf of requesting HCPs and ensures users meet HCP sampling requests even if they do not have the particular sample product requested on hand or the product is difficult to hand carry.

In one implementation, the customer relationship management subsystem 312 is capable of communication with multiple sources through the customer relationship management server 311 or through other channels to maintain a current and accurate collection of information regarding customer accounts. The interface with the multiple sources can be, for example, through an Applications Programming Interface or API, as the API interface will allow compatibility with a flexible array of third-party provider servers. The information being updated may include, but is not limited to, licensing information, area of practice, and location of the various customer accounts. In this manner, the customer relationship management subsystem 312 pulls the approved version of what represents an account, which may be a hospital or physician, which then pulls from multiple networks to ensure that the information regarding an account is up-to-date.

The customer relationship management subsystem 312 may be operated by a third party.

In one implementation, the CRM 310 may be a multi-tenant system where various elements of hardware and software may be shared by one or more customers. For instance, a server may simultaneously process requests from a plurality of customers. In a multi-tenant system, a user is typically associated with a particular customer. In one example, a user could be an employee of one of a number of pharmaceutical companies which are tenants, or customers, of the CRM 310.

In one embodiment, the CRM 310 may run on a cloud computing platform. Users can access content on the cloud independently by using a virtual machine image, or purchasing access to a service maintained by a cloud database provider. The customer relationship management subsystem 312 may be a cloud-based customer database that provides a central access to store and distribute consistent data across customer companies as well as their possible third-party partners and agencies that are used to keep this data updated. This system can provide standard data formats and provide an easy and automated way for customers to have access to coordinated and frequently updated CRM data.

In one embodiment, the CRM 310 may be provided as Software as a Service ("SaaS") to allow users to access it with a thin client.

In one implementation, the content in the controlled content repository 106 may be published to the Content Delivery Network ("CDN") so that the content can be served faster. The content delivery network (CDN) subsystem 110 is a distributed network to share content. Thus, instead of accessing the content from the controlled content repository 106 which may be at a remote location, the user computing devices may get the content from the CDN, as a global cache. Content may be uploaded and retrieved based on geographical nodes. Both zipped and unzipped versions are available.

Figure 4:
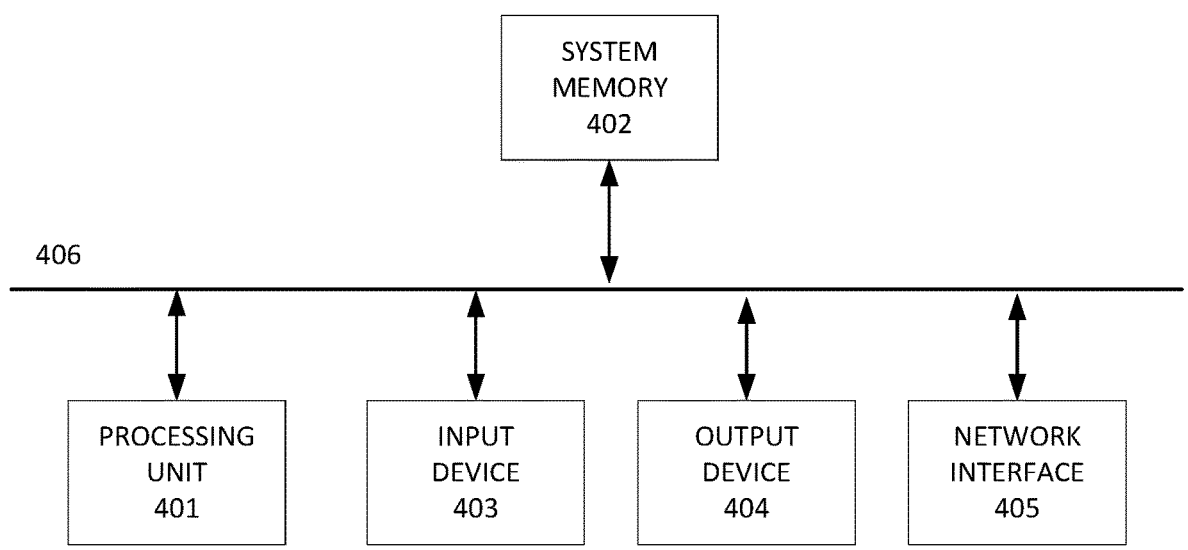
FIG. 4 illustrates an example block diagram of a computing device.

FIG. 4 illustrates an example block diagram of a computing device 400 which can be used as the user computing devices 120a-120n, and the customer management relationship server 311. The computing device 400 is only one example of a suitable computing environment and is not intended to suggest any limitation as to scope of use or functionality. The computing device 400 may include a processing unit 401, a system memory 402, an input device 403, an output device 404, a network interface 405 and a system bus 406 that couples these components to each other.

The processing unit 401 may be configured to execute computer instructions that are stored in a non-transitory computer-readable medium, for example, the system memory 402. The processing unit 401 may be a central processing unit (CPU).

The system memory 402 typically includes a variety of non-transitory computer readable media which may be any available media accessible by the processing unit 401. For instance, the system memory 402 may include computer storage media in the form of volatile and/or nonvolatile memory such as read only memory (ROM) and/or random access memory (RAM). By way of example, but not limitation, the system memory 402 may store instructions and data, e.g., an operating system, program modules, various application programs, and program data.

A user can enter commands and information to the computing device 400 through the input device 403. The input device 403 may be, e.g., a keyboard, a touchscreen input device, a touch pad, a mouse, a microphone, and/or a pen.

The computing device 400 may provide its output via the output device 404 which may be, e.g., a monitor or other type of display device, a speaker, or a printer.

The computing device 400, through the network interface 405, may operate in a networked or distributed environment using logical connections to one or more other computing devices, which may be a personal computer, a server, a router, a network PC, a peer device, a smart phone, or any other media consumption or transmission device, and may include any or all of the elements described above. The logical connections may include a network (e.g., the network 150) and/or buses. The network interface 405 may be configured to allow the computing device 400 to transmit and receive data in a network, for example, the network 150. The network interface 405 may include one or more network interface cards (NICs).

Figure 5:
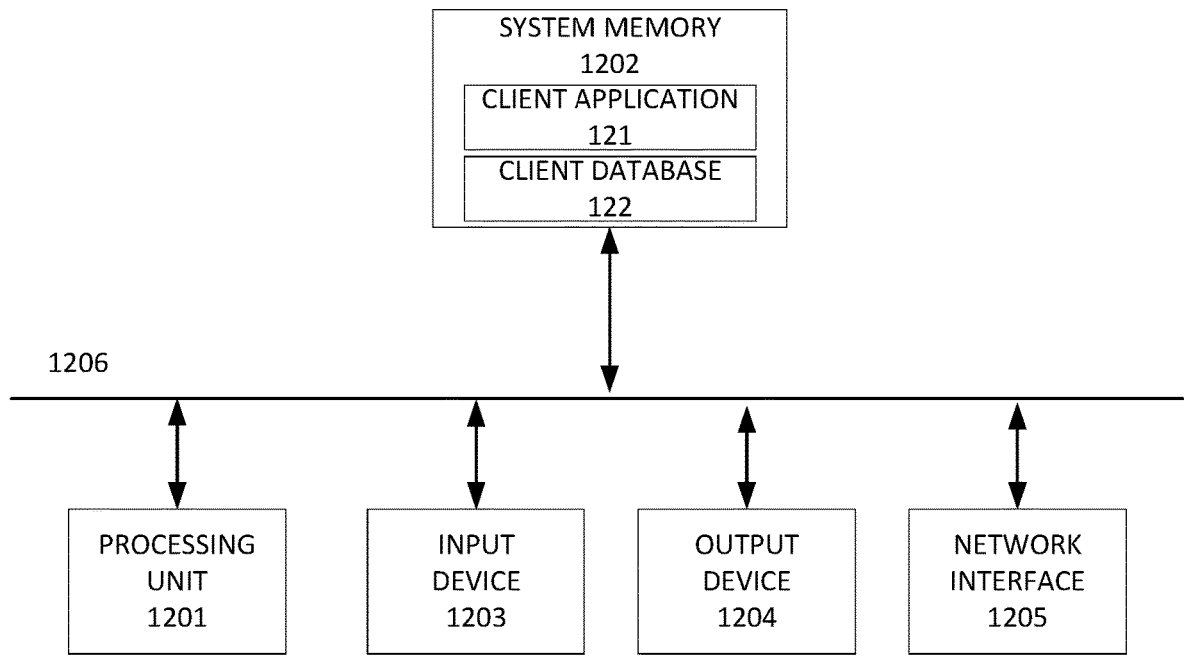
FIG. 5 illustrates an example high level block diagram of a user computing device.

FIG. 5 illustrates an example high level block diagram of a user computing device (e.g., 120a) wherein the present invention may be implemented. The user computing device 120a may be implemented by the computing device 400 described above, and may have a processing unit 1201, a system memory 1202, an input device 1203, an output device 1204, and a network interface 1205, coupled to each other via a system bus 1206. The system memory 1202 may store the client application 121, and the client database 122.

Figure 6A:
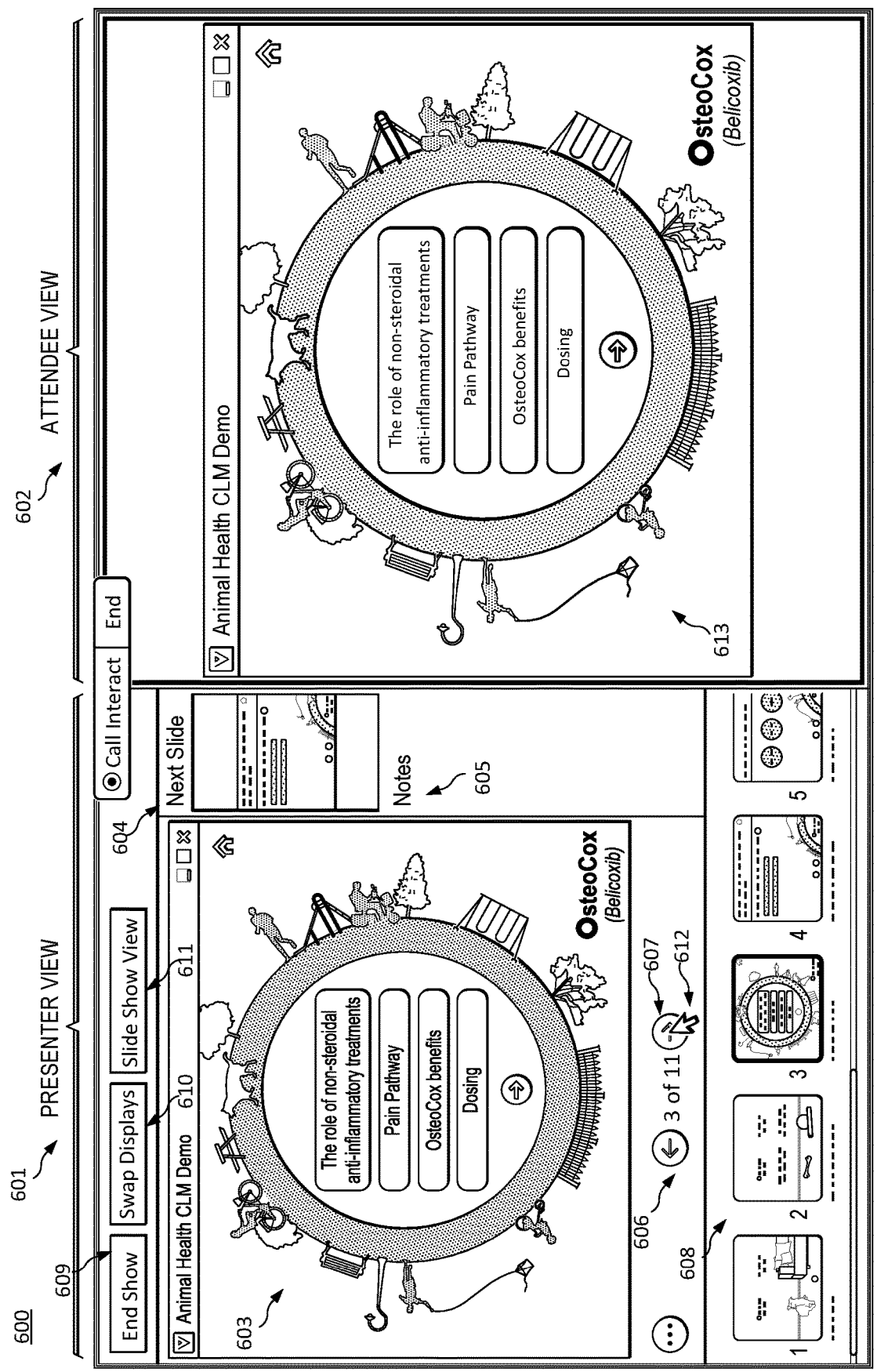
FIG. 6A illustrates side-by-side screenshots showing both presenter view and attendee view displays during delivery of approved content in accordance with some embodiments.

FIG. 6A illustrates side-by-side screenshots showing both presenter view and attendee view displays during delivery of controlled approved content 600 in accordance with some embodiments of the present invention. In one implementation, the presenter view 601 may display what is present on the presenter's (e.g., pharmaceutical representative) display. In some implementations, the presenter view may contain confidential content intended only for presenter viewing. On the presenter view 601, there is a current slide window 603, next slide preview 604, current slide notes 605, previous slide button 606, next slide button 607, slide tray 608, end show button 609, swap displays button 610 and slide show view button 611. The cursor 612 is the position indicator on the displays that may be controlled by the input device 1203 (e.g., mouse, touchscreen, or similar).

In one implementation, the current slide window 603 shows the current slide being presented in the approved content presentation. This is the same slide being displayed in the attendee view within the attendee slide window 613. The next slide preview 604 displays the next slide in sequence in the approved content presentation. The next slide preview 604 may be expanded or contracted as will be described in FIG. 6D. A notification of the end of slide show will be displayed when the presenter reaches the end of the approved content presentation. The current slide notes 605 displays any annotations, or input text if available from the presenter. The presenter may need to reference confidential information during the delivery of the presentation. The current slide notes 605 may be expanded or contracted as will be described in FIG. 6D. When the previous slide button 606 is selected, the content delivery server 104 navigates the approved content presentation to the previous slide in the approved content presentation. The current slide window 603 and attendee slide window 613 will subsequently be updated accordingly by the content delivery server 104 to reflect the new current slide. Similarly, when the next slide button 607 is selected, the content delivery server 104 navigates the approved content presentation to the next slide in the approved content presentation. The current slide window 603 and attendee slide window 613 will subsequently be updated accordingly by the content delivery server 104 to reflect the new current slide. The slide tray 608 shows the sequence of slides contained in the approved content presentation. The slide tray may be navigated using inputs from the input device 1203. For instance, the keyboard arrow keys, mouse clicks and/or scrolling, as well as touchscreen inputs may control the browsing of the various slides contained in the approved content presentation. When the end show button 609 is selected, the content delivery server 104 terminates the approved content presentation. The swap displays button 610 is only available when there are at least two monitors enabled. In the case the presenter (e.g., pharmaceutical representative) is presenting the approved content presentation using a secondary monitor/projector, initially the presenter view may be displayed on the primary display while the attendee view may be displayed on the secondary monitor for the attendee (e.g., HCP) to view. The content delivery server 104 may switch the presenter view to the secondary monitor while the attendee view may be displayed on the primary display. When the slide show view button 611 is selected, the content delivery server 104 may enable the slide show on the presenter display beginning from the current slide depicted in the current slide window 603. The content delivery server 104 terminates the current presenter view and uses the attendee slide window as the new presenter view.

In one implementation, the slide tray 608 may support sub presentations. Sub presentations may be a required set of slides that must be shown prior to displaying certain target slides within the main presentation. A sub presentation may be displayed as a stacked slide labeled "Required Slide(s)". The main presentation slides may be greyed out and not accessible until the required sub presentation slides have been viewed. Once the sub presentation slides have been viewed, the associated main presentation slides may be un-greyed out. The sub presentation slides may subsequently be greyed out, while still being accessible when selected. The required labels may also be removed after fulfilling the viewing requirement.

In one implementation, the attendee view 602 may display what is to be presented to the attendee (e.g., health care professional). When the presenter (e.g., pharmaceutical representative) uses a secondary monitor or projector to deliver approved content in-person, the attendee view 602 may be displayed on the secondary monitor/screen. In another implementation, the attendee view 602 may be what is displayed on the attendee's (e.g., health care professional) personal display during remote meetings. The attendee slide window 613 in the attendee view 602 may be expanded to the full screen or occupy only a portion of the display area. The presenter view 601 and attendee view 602 may be displayed on separate presenter displays, or jointly on the same presenter display.

In one implementation, when the presenter view 601 and attendee view 602 are displayed jointly on the same presenter screen, the presenter view 601 is in the foreground and the attendee view 602 is in the background. The attendee slide window 613 in the attendee view 602 may be expanded to the full screen. Both presenter view 601 and attendee view 602 occupy the full screen with the attendee view 602 designated as the active element.

Figure 6B:
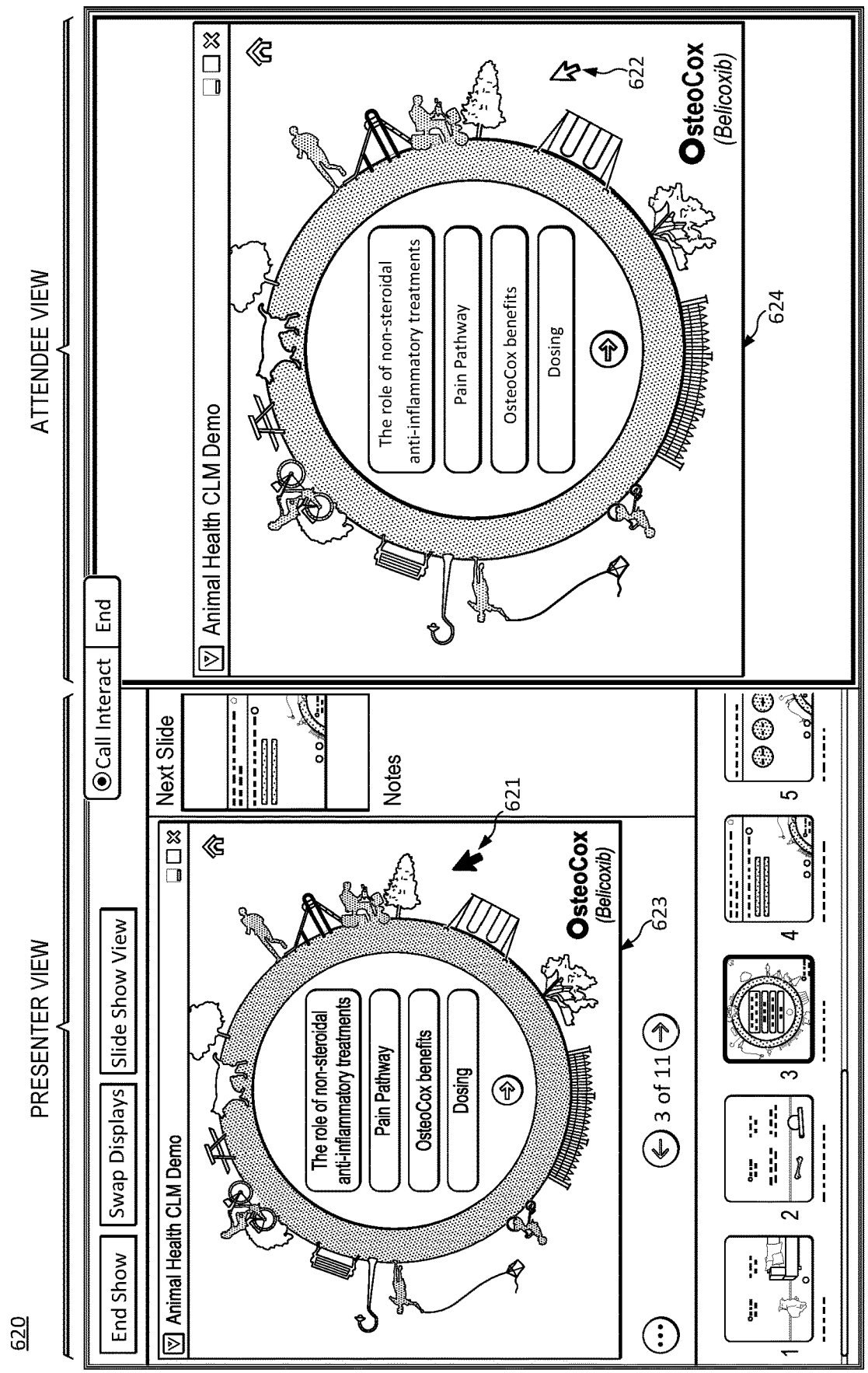
FIG. 6B illustrates side-by-side screenshots showing both presenter view and attendee view displays during delivery of approved content when the virtual cursor is enabled in accordance with some embodiments.

FIG. 6B illustrates side-by-side screenshots showing both presenter view and attendee view displays during delivery of controlled approved content 620 when the virtual cursor is enabled in accordance with some embodiments. In one implementation, the virtual cursor 621 is engaged by clicking within the current slide window 603 using the input device 1203 (e.g., mouse, touchscreen, or similar). The delivery content server 104 displays the attendee view cursor 622 in the corresponding position in the attendee slide window 613. Once the virtual cursor is enabled, the delivery content server 104 may change the mirrored virtual cursor 621 to a different color fill or shape to indicate the enabled state. The delivery content server 104 also hides cursor 612 to avoid confusion with the virtual cursor 621. When the virtual cursor 621 is enabled, only virtual cursor movement within the current slide window 603 boundary and attendee view cursor movement within the attendee slide window 613 boundary are reflected in the attendee slide window 613. For instance, when the virtual cursor 621 position moves from a position in the current slide window 603 to outside the current slide window boundary 623, the delivery content server 104 may hide the virtual cursor 621 and attendee view cursor 622, while also unhiding the cursor 612. Similarly, when the attendee slide window 613 is minimized, or when the attendee view cursor 622 moves from a position in the attendee slide window 613 to outside the attendee slide window boundary 624, the delivery content server 104 may hide the virtual cursor 621 and attendee view cursor 622, while also unhiding the cursor 612. The process for delivery of approved content using the virtual cursor will be described in further detail below in FIG. 12.

Figure 6C:
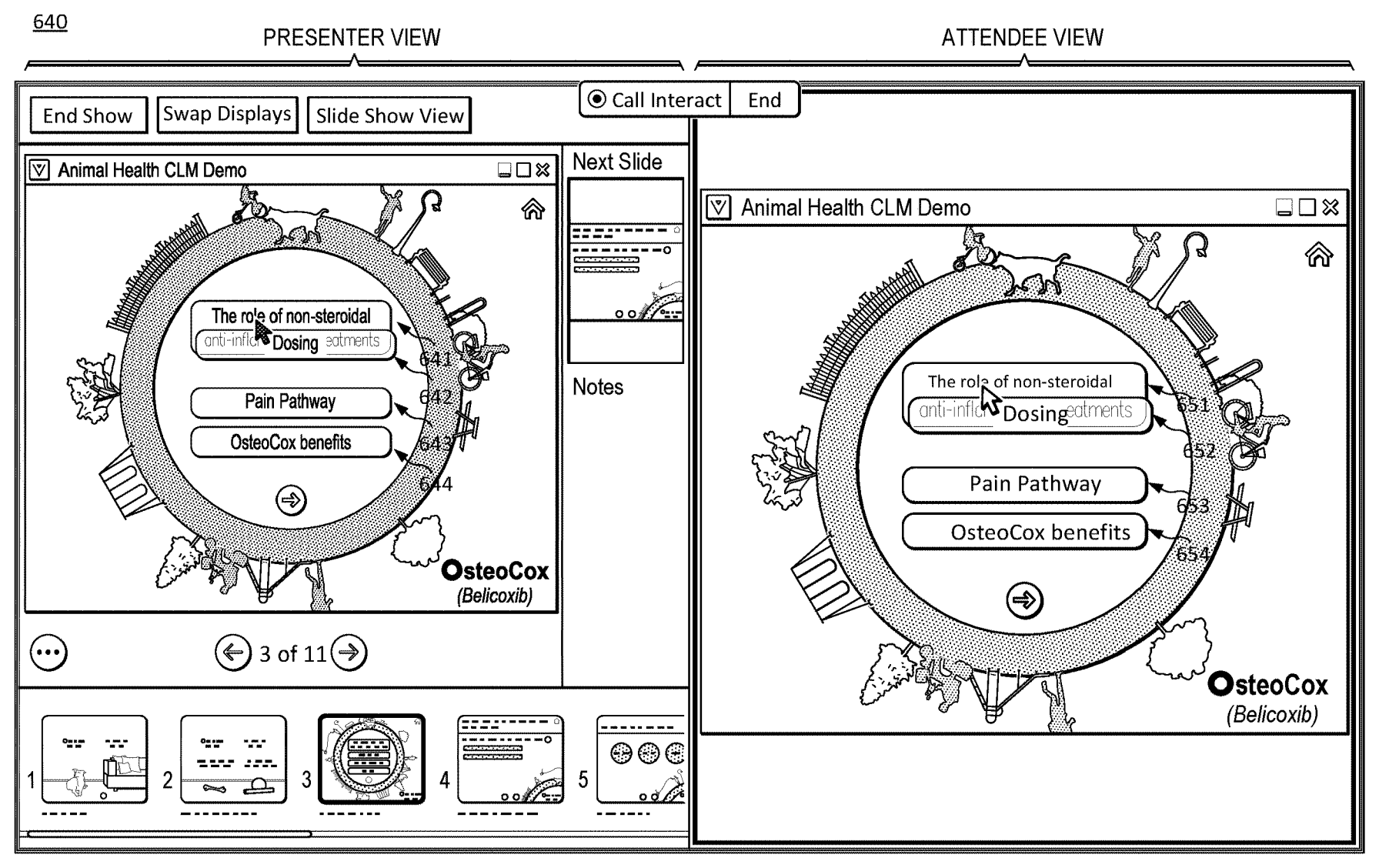

FIG. 6C illustrates side-by-side screenshots showing both presenter view and attendee view displays when engaging with the interactive presentation during delivery of controlled approved content 640 in accordance with some embodiments. Some of the approved content available in the controlled content repository 106 may include presentations containing interactive elements (e.g. manipulatable elements, combo boxes, text input fields, etc.). In one implementation, as shown in FIG. 6C, the presenter (e.g., pharmaceutical representative) may direct the attendee (e.g., health care professional) to re-order a grouping of items. The presenter may use the input device 1203 (e.g., mouse, touchscreen, or similar) to manipulate each of the interactive elements on the presenter view 641, 642, 643, 644 as well as the corresponding interactive elements on the attendee view 651, 652, 653, 654, respectively. When the position of interactive element 642 is changed in the presenter view, the corresponding interactive element 652 is moved to the same corresponding position in the attendee slide window 613. Similarly, when the position of interactive element 652 is changed in the attendee view, the corresponding interactive element 642 is moved to the same corresponding position in the current slide window 603.

Figure 6D:
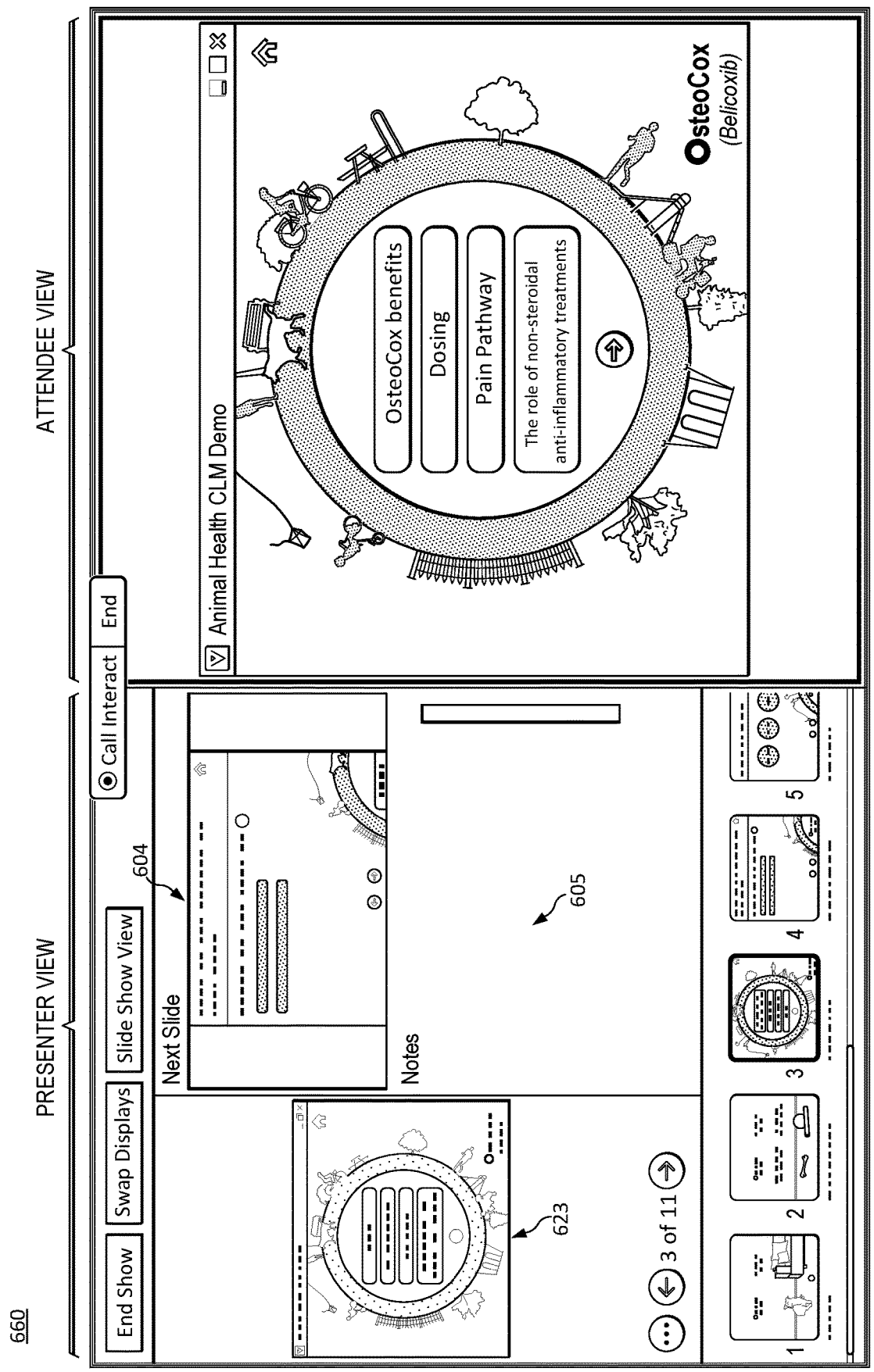
FIG. 6D illustrates side-by-side screenshots showing both presenter view and attendee view displays when resizing the current slide boundaries during delivery of approved content in accordance with some embodiments.

FIG. 6D illustrates side-by-side screenshots showing both presenter view and attendee view displays when resizing the current slide boundaries 623 during delivery of approved content 660 in accordance with some embodiments. As shown, depending on the resizing of the current slide boundaries 623, the next slide preview 604 and current slide notes 605 sections are resized accordingly. In one implementation, the presenter (e.g., pharmaceutical representative) may wish to enlarge the notes section to make the annotations more legible. The presenter may use the input device 1203 (e.g., mouse, touchscreen, or similar) to manipulate the next slide preview 604 or current slide notes 605 section dimensions. When the next slide preview 604 and current slide notes 605 sections are enlarged, the current slide 603 section and current slide boundaries 623 are correspondingly reduced in dimensions. The opposite occurs when the next slide preview 604 or current slide notes 605 section dimensions are reduced.

Figure 7A:
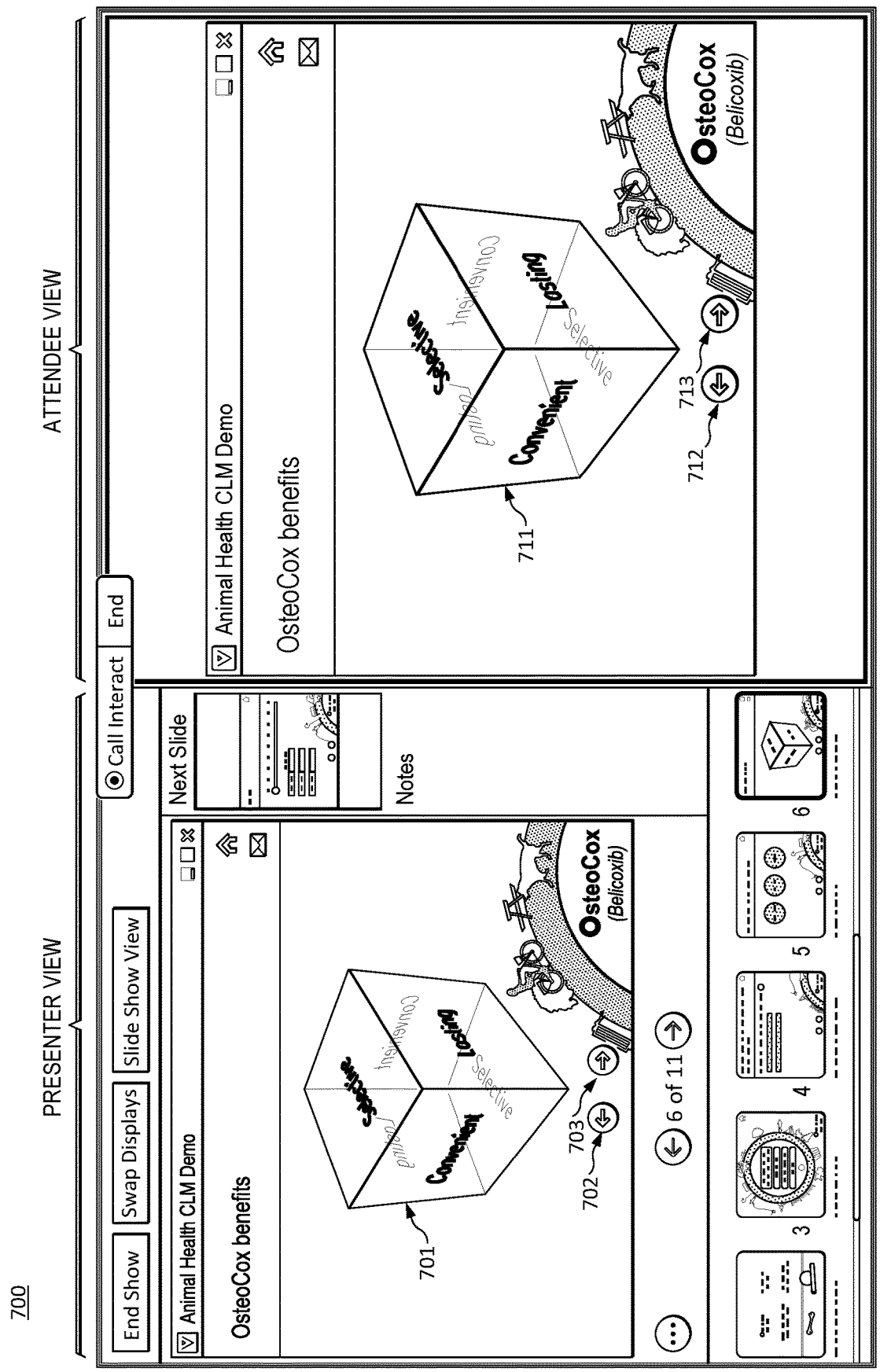
FIG. 7A illustrates additional side-by-side screenshots showing both presenter view and attendee view displays during delivery of approved content in accordance with some embodiments.
Figure 7B:
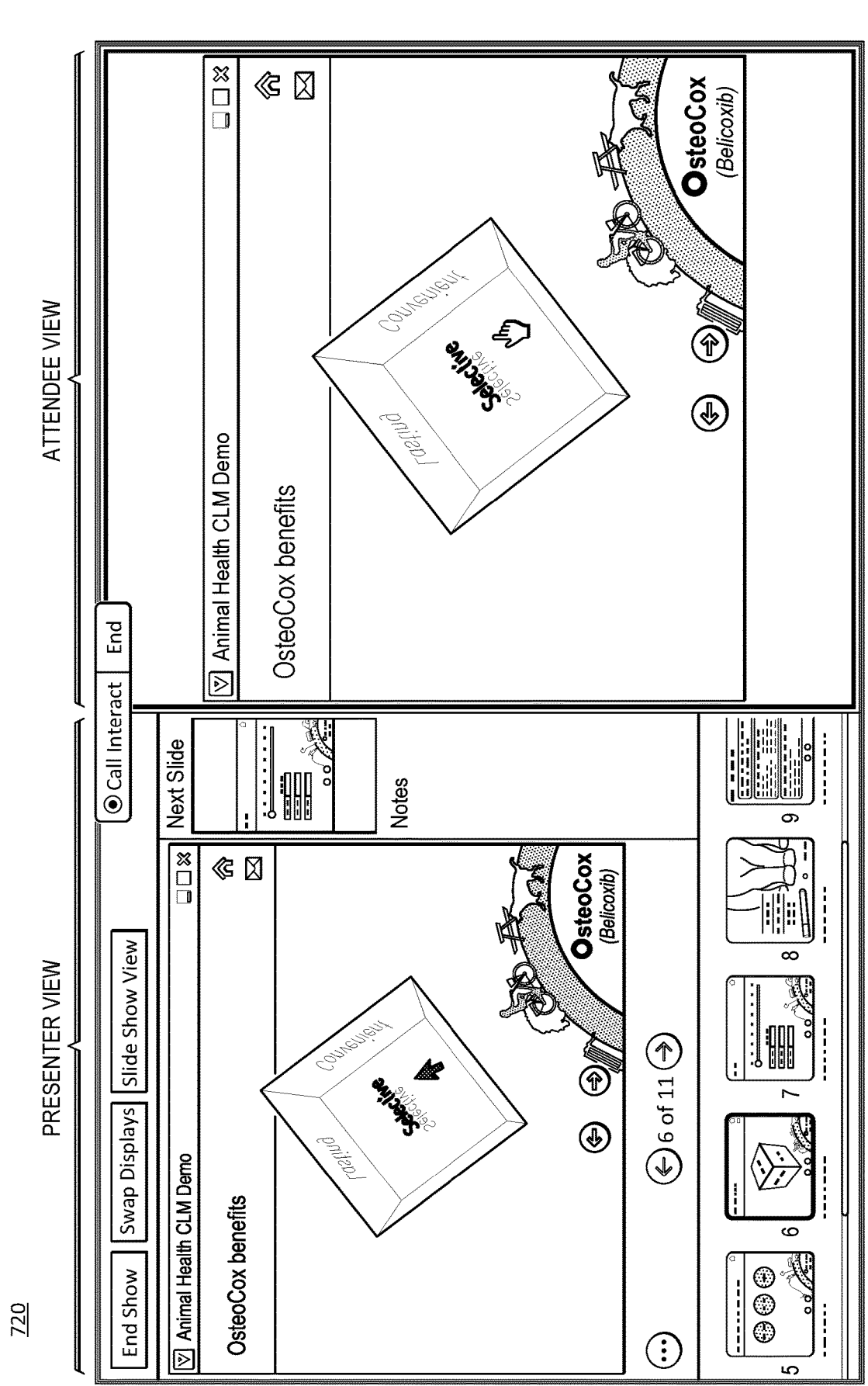
FIG. 7B illustrates additional side-by-side screenshots showing both presenter view and attendee view displays when engaging with the interactive presentation during delivery of approved content in accordance with some embodiments.
Figure 7C:
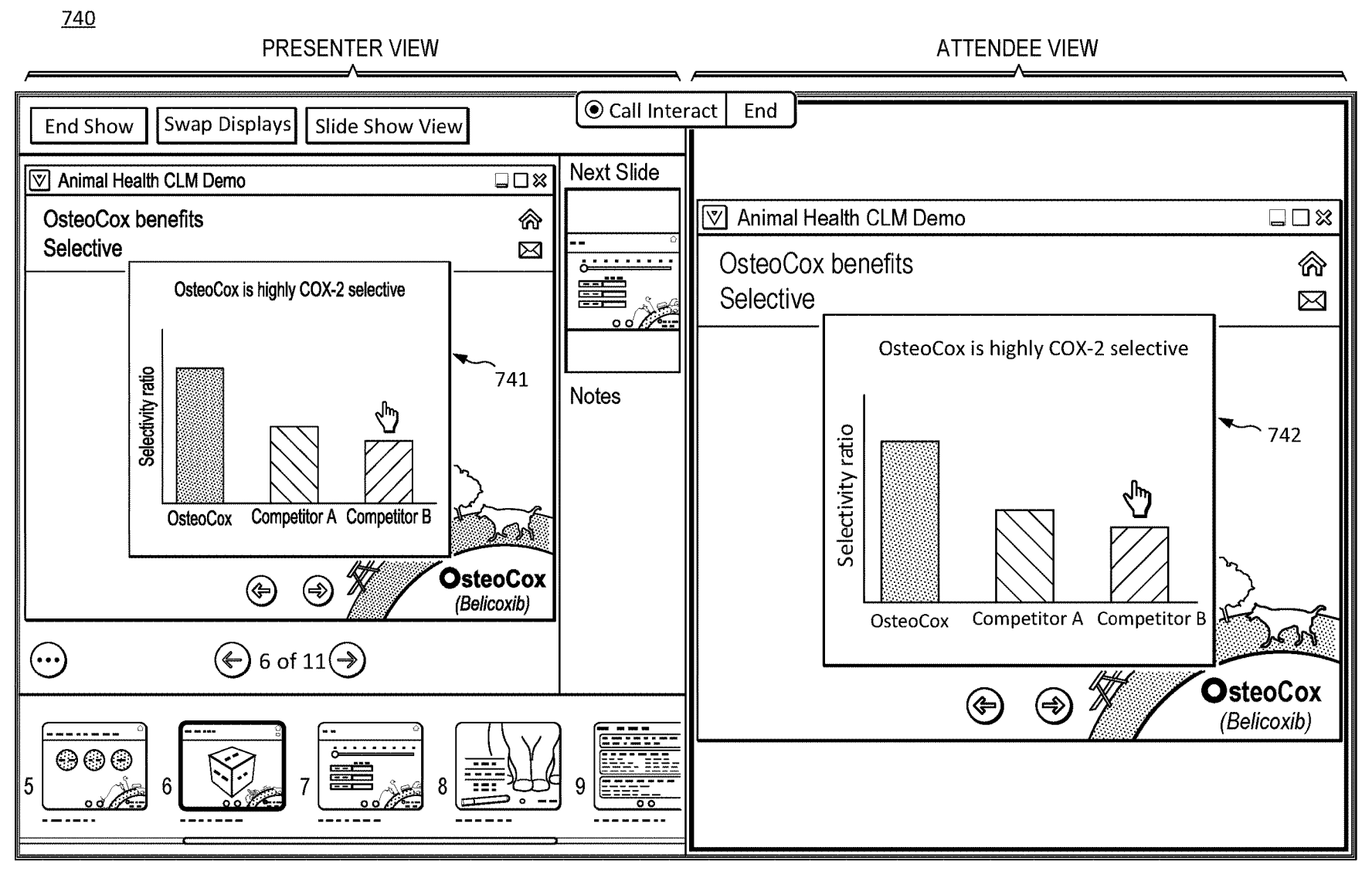

FIG. 7A illustrates additional side-by-side screenshots showing both presenter view and attendee view displays during delivery of approved content 700 in accordance with some embodiments. Some of the approved content available in the controlled content repository 106 may include presentations containing interactive elements (e.g. manipulatable elements, combo boxes, text input, etc.). In one implementation, the presenter (e.g., pharmaceutical representative) may examine with the attendee (e.g., health care professional) a graphical representation of multiple benefits of a pharmaceutical. As shown in FIG. 7A, there are multiple benefits in the form of a cube, with each facet of the cube representing a single benefit. The presenter may use the input device 1203 (e.g., mouse, touchscreen, or similar) to manipulate each of the interactive elements on the presenter view 701, 702, 703 as well as the corresponding interactive elements on the attendee view 711, 712, 713, respectively. As depicted in FIG. 7B, the presenter may use the input device 1203 (e.g., mouse, touchscreen, or similar) to click and drag the interactive element 701 or 711 to rotate to a desired facet of the cube. Similarly, using the input device 1203, the presenter may select 702, 712 to cycle backward or select 703, 713 to cycle forward through the facets of the cube. Each facet may also contain additional interactive features, such as opening an overlay with more information. In another implementation, additional interactive features may include links (e.g., HTML or PDF), videos, animations, zooming in/out, rotation of the slide, etc. As depicted in FIG. 7C, when the presenter selects a facet of the cube, additional graphical information appears in the form of an overlay window 741, 742.

Figure 8:
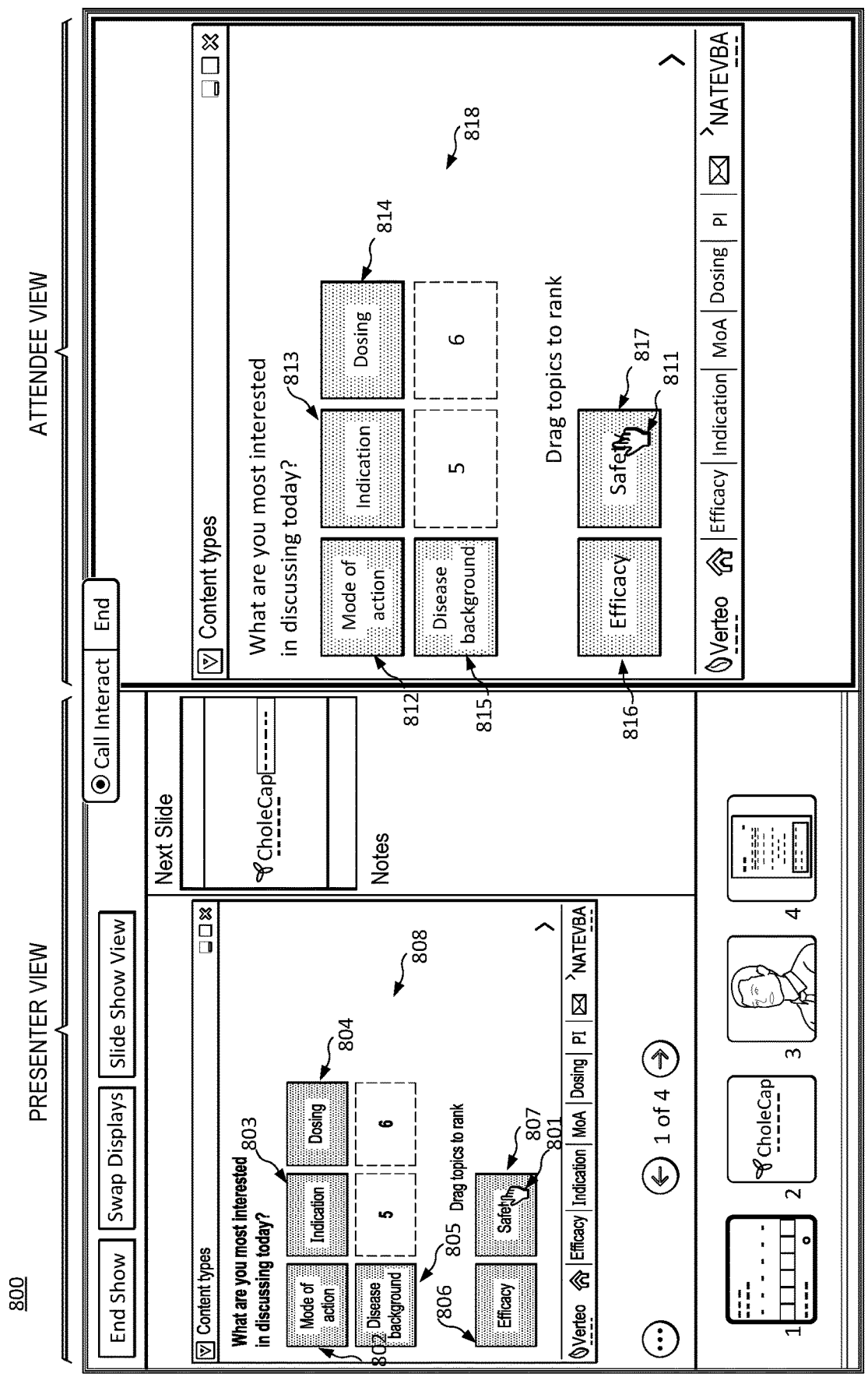
FIG. 8 illustrates additional side-by-side screenshots showing both presenter view and attendee view displays when engaging with the interactive presentation during delivery of approved content in accordance with some embodiments.

FIG. 8 illustrates additional side-by-side screenshots showing both presenter view and attendee view displays when engaging with the interactive presentation during delivery of approved content 800 in accordance with some embodiments. Some of the approved content available in the controlled content repository 106 may include presentations containing interactive elements (e.g. manipulatable elements, combo boxes, text input fields, etc.). In one implementation, as shown in FIG. 8, the presenter (e.g., pharmaceutical representative) may direct the attendee (e.g., health care professional) to rank a listing of topics, attributes, etc. in order of importance. The presenter may engage the virtual cursor 801 and use the input device 1203 (e.g., mouse, touchscreen, or similar) to manipulate the different interactive elements 802, 803, 804, 805, 806, 807 as well as the corresponding interactive elements on the attendee view 812, 813, 814, 815, 816, 817, respectively. Once the virtual cursor 801 is engaged, the content delivery server 104 may hide the cursor 612, displays the attendee view cursor 811 and the virtual cursor 801 in corresponding positions on the attendee slide window 818 and current slide window 808, respectively. Each manipulation of an interactive element on the attendee slide window 818 is reflected in the current slide window 808, and vice versa. For instance, when the interactive element 802 is placed in the number 1 ranking position in the presenter view, the corresponding interactive element 812 is moved to the same corresponding position in the attendee slide window 818. Similarly, when the position of interactive element 813 is placed in the number 2 ranking position in the attendee view, the corresponding interactive element 803 is moved to the same corresponding position in the current slide window 808.

Figure 9A:
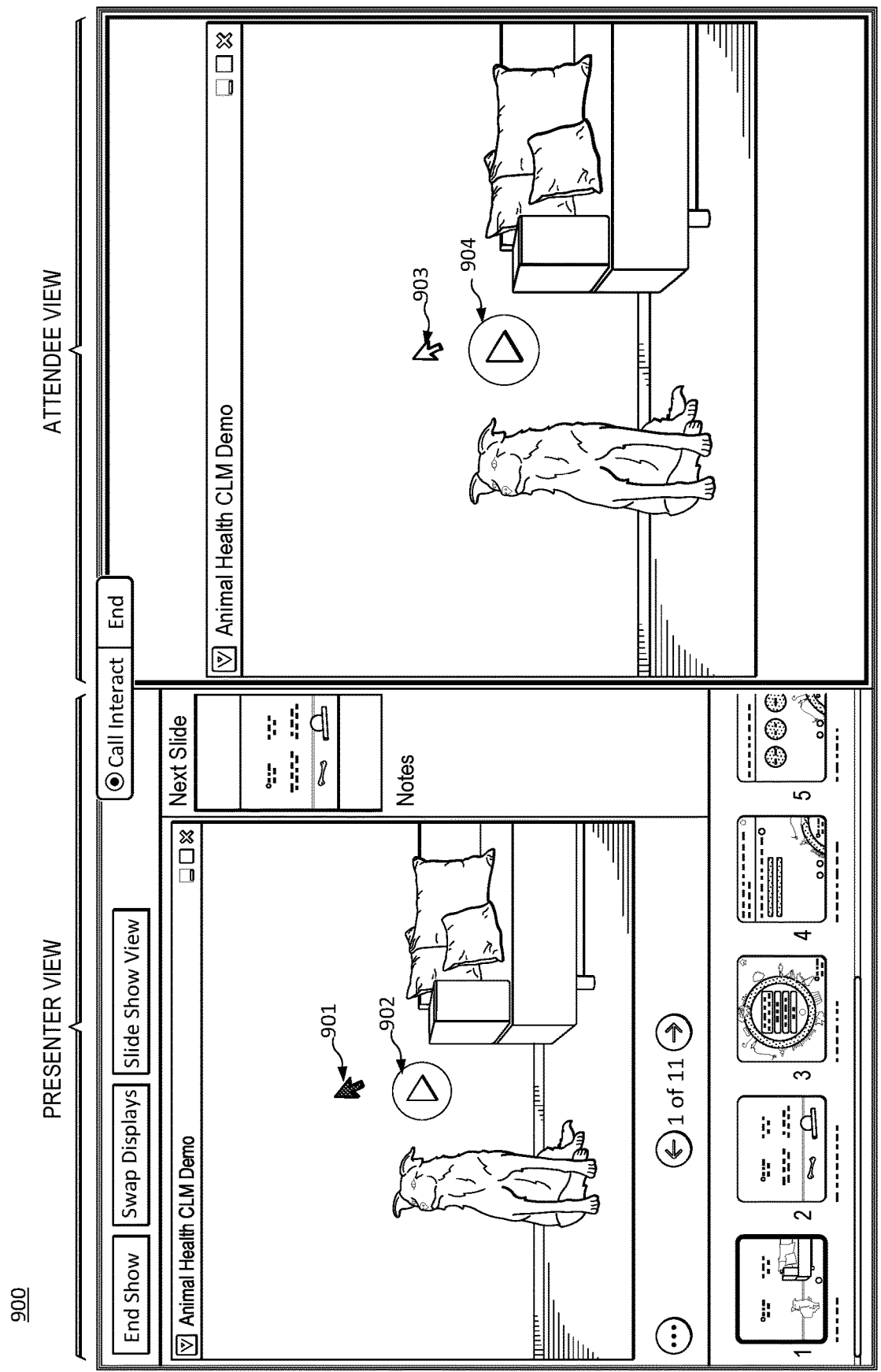
FIG. 9A illustrates side-by-side screenshots showing both presenter view and attendee view displays during delivery of approved content including video in accordance with some embodiments.

FIG. 9A illustrates side-by-side screenshots showing both presenter view and attendee view displays during delivery of approved content including video 900 in accordance with some embodiments. Some of the approved content available in the controlled content repository 106 may include presentations containing interactive elements (e.g. videos, animations, etc.). The presenter (e.g., pharmaceutical representative) may engage the virtual cursor 901 and use the input device 1203 (e.g., mouse, touchscreen, or similar) to manipulate the different interactive elements 902 as well as the corresponding interactive elements 904 on the attendee view, respectively. Once the virtual cursor 901 is engaged, the content delivery server 104 may hide the cursor 612, displays the attendee view cursor 903 and the virtual cursor 901 in corresponding positions on the attendee slide window and current slide window, respectively.

Figure 9B:
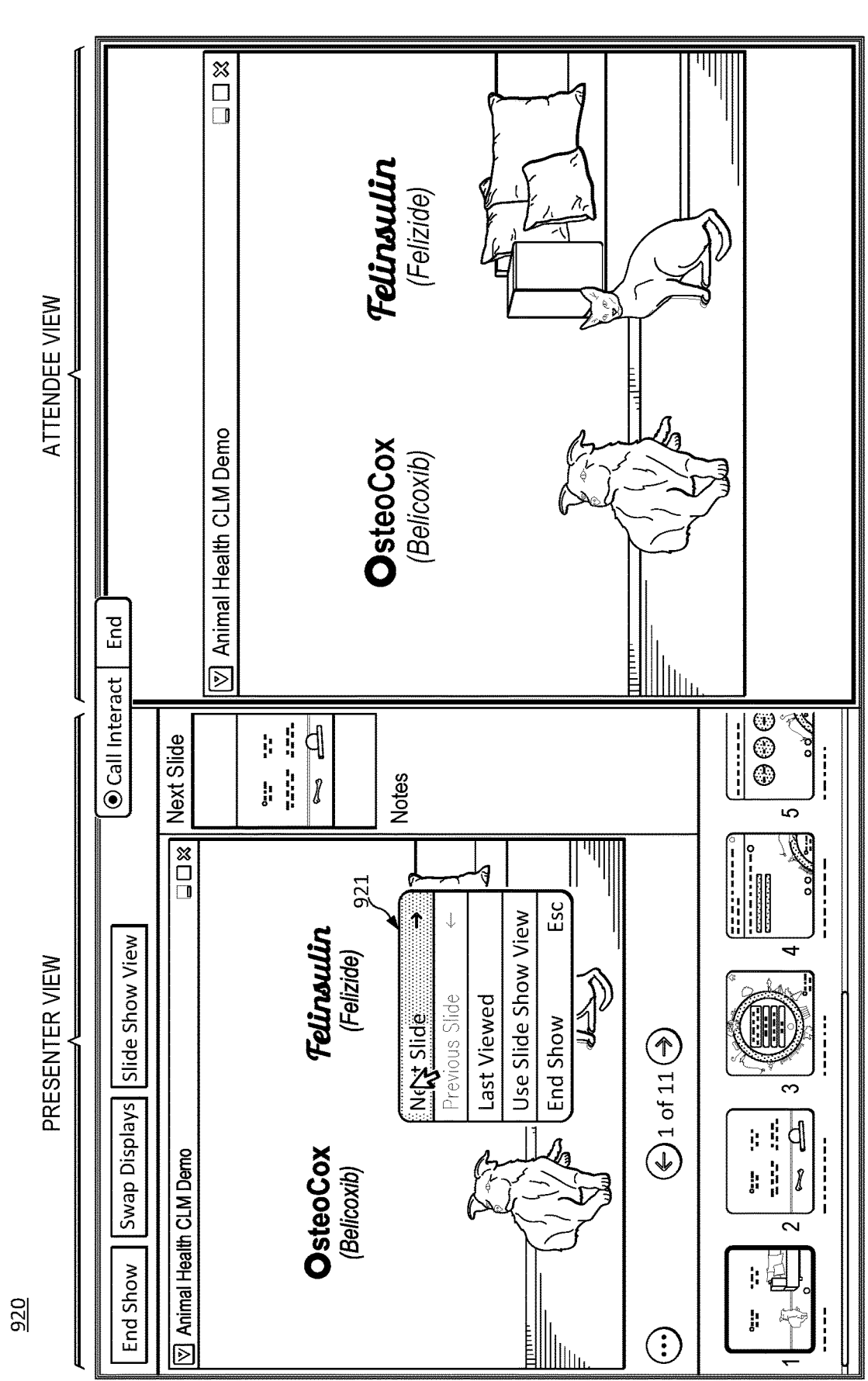
FIG. 9B illustrates additional side-by-side screenshots showing both presenter view and attendee view displays when engaging with the presentation during delivery of approved content including video in accordance with some embodiments.

In another implementation, FIG. 9B illustrates additional side-by-side screenshots showing both presenter view and attendee view displays when engaging with the presentation during delivery of approved content including video 920 in accordance with some embodiments. The presenter (e.g., pharmaceutical representative) may use the input device 1203 (e.g., mouse, touchscreen, or similar) to right-click to access an additional menu of controls 921.

Figure 10:
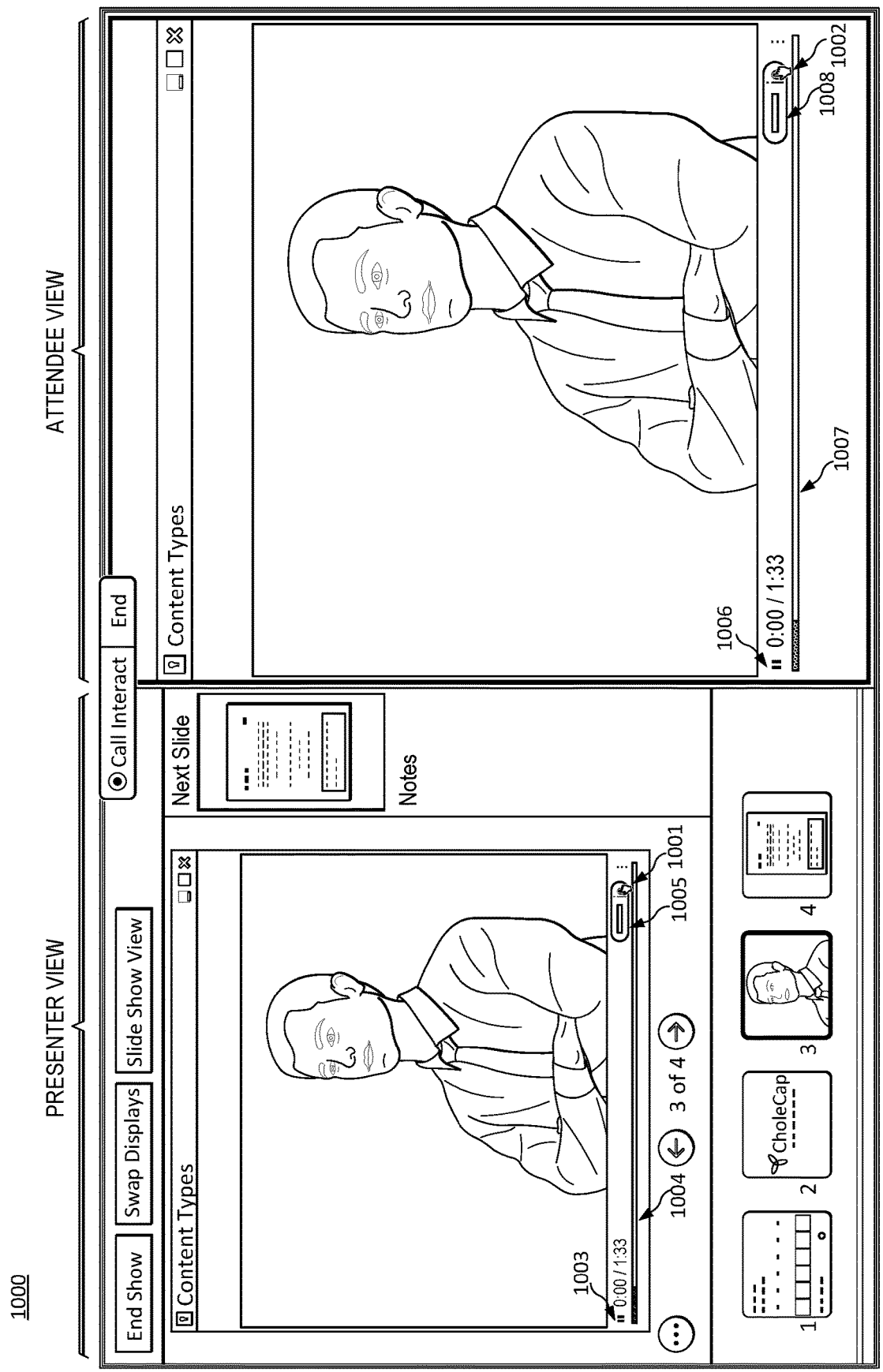
FIG. 10 illustrates additional side-by-side screenshots showing both presenter view and attendee view displays when engaging with the presentation during delivery of approved content including video in accordance with some embodiments.

In yet another implementation, FIG. 10 illustrates additional side-by-side screenshots showing both presenter view and attendee view displays when engaging with the presentation during delivery of approved content including video 1000 in accordance with some embodiments. The presenter (e.g., pharmaceutical representative) may engage the virtual cursor 1001 and attendee view cursor 1002, then use the input device 1203 (e.g., mouse, touchscreen, or similar) to manipulate the different interactive elements 1003, 1004, 1005 as well as the corresponding interactive elements on the attendee view 1006, 1007, 1008, respectively. The various multimedia controls are available for use. The video may be played, paused, stopped, fast-forwarded, rewound, muted, volume adjusted, etc.

Figure 11A:
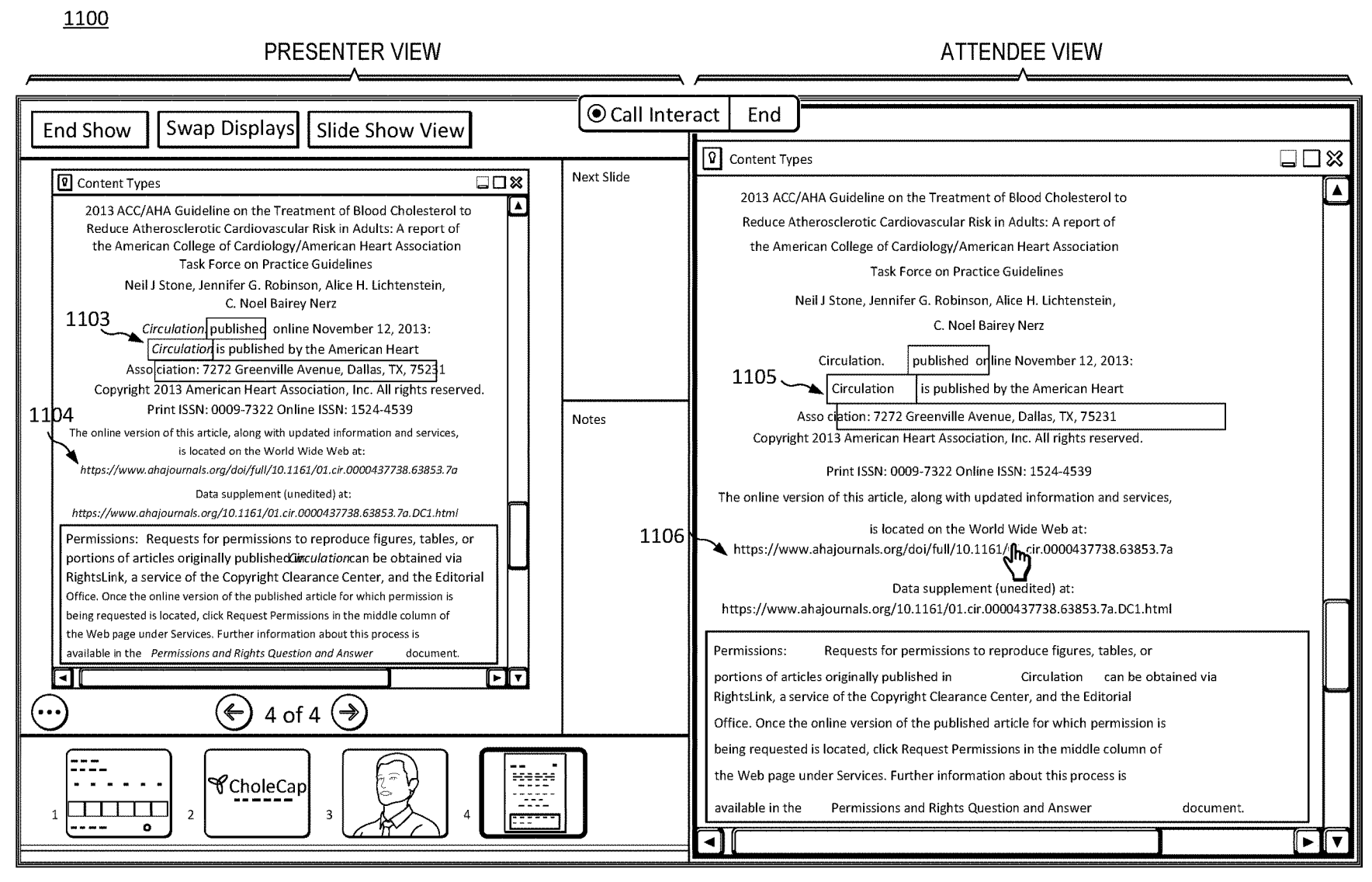

FIG. 11A illustrates additional side-by-side screenshots showing both presenter view and attendee view displays when engaging with the presentation during delivery of approved content including interactive documents 1100 in accordance with some embodiments. Some of the approved content available in the controlled content repository 106 may include presentations containing interactive elements (e.g. highlightable/searchable text, combo boxes, text input fields, links, etc.). In one implementation, as shown in FIG. 11A, the presenter (e.g., pharmaceutical representative) may review a document in detail with the attendee (e.g., health care professional). For instance, the presenter may present a PDF document. The presenter may engage the virtual cursor and use the input device 1203 (e.g., mouse, touchscreen, or similar) to manipulate the different interactive elements 1103, 1104 as well as the corresponding interactive elements on the attendee view 1105, 1106, respectively. Once the virtual cursor is engaged, the content delivery server 104 may hide the cursor 612, displays the attendee view cursor and the virtual cursor in corresponding positions on the attendee slide window and current slide window, respectively. In one implementation, the interactive elements 1103 and 1105 may include highlightable text, which may be copied to a clipboard for presenter/attendee convenience. For instance, there may be complex scientific terms or hard to spell words that warrant further inspection or searching the internet. This provides the capability to conveniently copy the term/word so that it may be searched without errors. Interactive features 1104 and 1106 may be links that navigate the presenter and attendee to another page/document with additional information. In one implementation, the links may be Uniform Resource Locator (URL), or a file path to another document within an online directory.

Figure 11B:
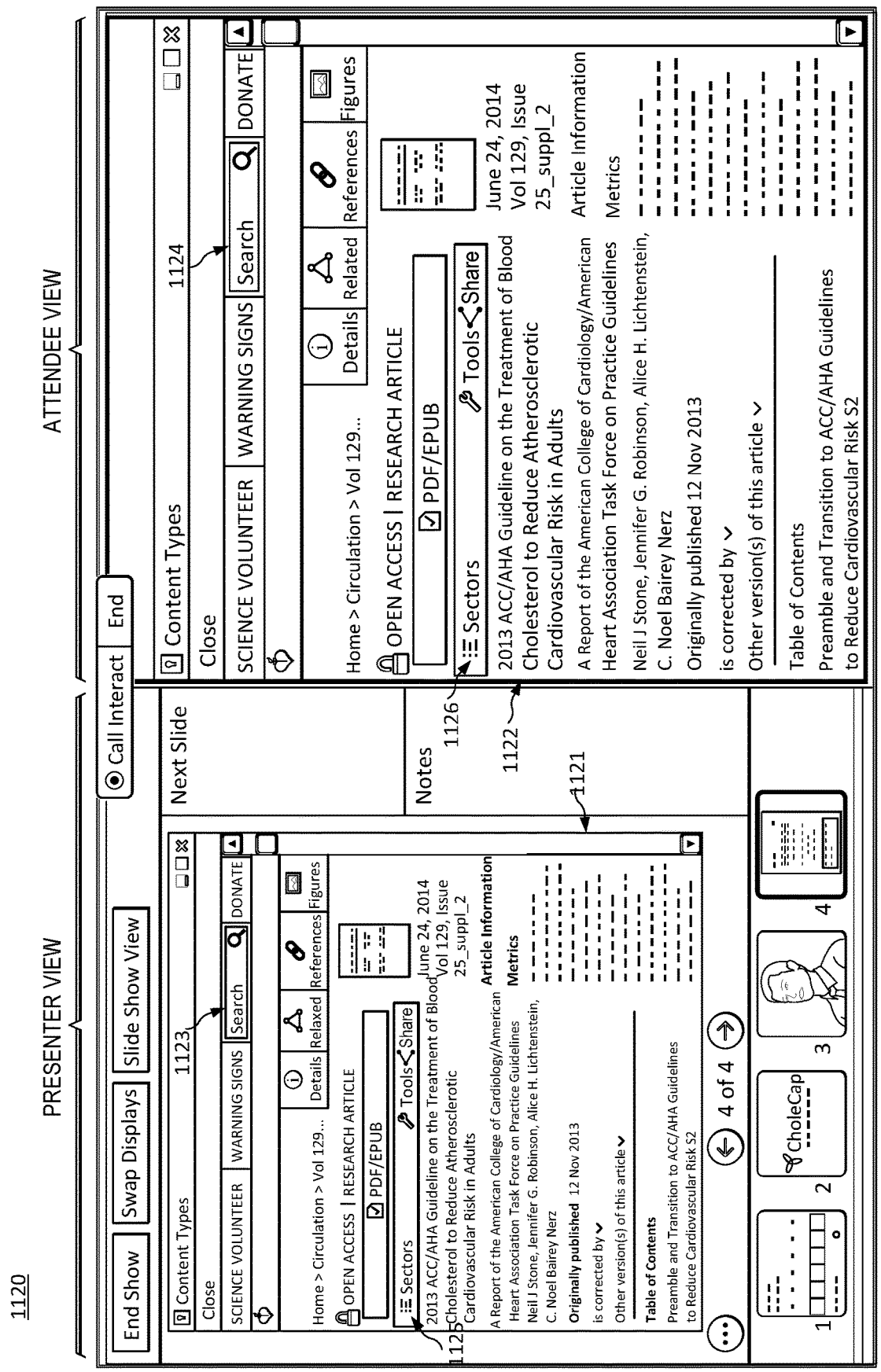
FIG. 11B illustrates another side-by-side screenshot showing both presenter view and attendee view displays when engaging with the presentation during delivery of approved content including interactive documents in accordance with some embodiments.

In one implementation, FIG. 11B depicts when the presenter or attendee selects interactive features 1104 or 1106 in FIG. 11A. The content delivery server 104 may open the link and display the HTML website. The current slide view 1121 and attendee slide view 1122 may contain additional interactive features. For instance, interactive features 1123, 1124 may be a text input field such as a search bar. Entering a search request may navigate the presenter/attendee to another webpage with additional information and additional interactive features. Interactive features 1125, 1126 may include combo boxes, drop down lists, or menus that provide additional capabilities. These interactive features should be understood that they have been presented by way of example only, and not limitation.

Figure 12:
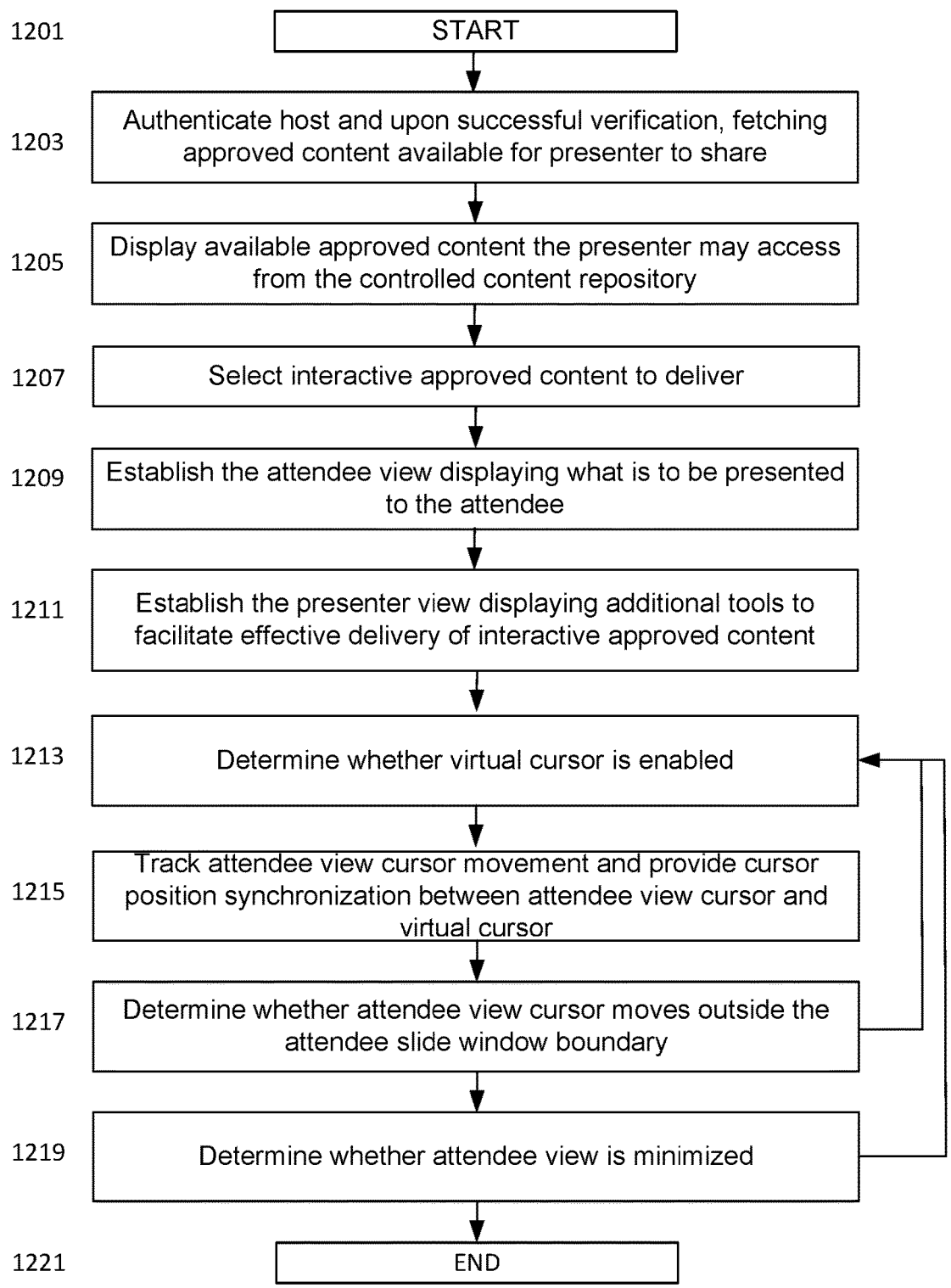
FIG. 12 illustrates a flowchart of a method for delivery of approved content according to one embodiment of the present invention.

FIG. 12 provides an exemplary process flowchart 1200 for using the virtual cursor for delivery of approved content according to one embodiment of the present invention. The process may start at 1201. At step 1203, if not already logged in, the presenter (e.g., pharmaceutical representative) enters their login details and signs into the CRM 310 and content management system 210. Upon successful verification of the login details, the presenter is authenticated. Once the presenter successfully logs in, compliant content available to the signed-in presenter is fetched.

In another implementation, the above step 1203 may be optional or performed at a later time. Content may be accessed from a locally stored library listing approved optimized content available for sharing without requiring the presenter (e.g., pharmaceutical representative) to enter their login details to sign into the CRM 310 and content management system 210.

At 1205, the delivery content server 104 displays the available approved content the presenter may access. Interactive approved content available in the controlled content repository 106 may include documents, images, videos, or presentations containing interactive elements (e.g. manipulatable elements, animations, videos, highlightable/searchable text, combo boxes, text input fields, links, etc.).

In one embodiment, the content may be accessed from a content management system, e.g., 210. The listing of the approved optimized content library available for remote delivery can be accessed from a call detail page or account detail page. In one implementation, the customer relationship management server 311 may access the customer account information from the customer relationship management subsystem 312, apply the alignment rules to align the customer account information with content available from the controlled content repository 106.

At 1207, the presenter (e.g., pharmaceutical representative) may select the approved content they wish to share with the attendee (e.g., health care professional). In another implementation, the presenter may select approved content from a media library without requiring authentication into the CRM 310 and content management system 210.

At 1209, the delivery content server 104 establishes the attendee view 602. The attendee view 602 may display what is to be presented to the attendee (e.g., health care professional). The delivery content server 104 may output the selected approved content to the attendee slide window 613 in the attendee view 602. In some embodiments, the delivery content server 104 may utilize a stacking window manager, Desktop Window Management stack, or similar. This method has shown to not only retain high source resolution but also a high frame rate necessary for video approved content slides. In one implementation, the delivery content server 104 may host an enterprise-controlled landing page and an associated media player application that displays the approved content. In another implementation, the unzipped version of the content is accessed from CDN 110 and displayed in the browser player.

At 1211, the delivery content server 104 establishes the presenter view 601. In one implementation, the delivery content server 104 mirrors the approved content of the attendee slide window 613 into the current slide window 603. Subsequently, the delivery content server 104 may overlap and stack the attendee view 602 and presenter view 601. In some embodiments, the delivery content server 104 may utilize a stacking window manager, Desktop Window Management stack, or similar. This method has shown to not only retain high source resolution but also a high frame rate necessary for video approved content slides.

In one implementation, once the approved content is selected, the delivery content server 104 may automatically output to the presenter view as depicted in FIGS. 6-11. In another implementation, the presenter view may be a user preference or setting that can be disabled.

In one implementation, when the presenter view 601 and attendee view 602 are displayed jointly on the same presenter screen, the presenter view 601 is in the foreground and the attendee view 602 is in the background. Both presenter view 601 and attendee view 602 occupy the full screen with the attendee view 602 designated as the active element.

At 1213, determination is made whether the virtual cursor is enabled. In one implementation, a single left-click from the user input device 1203 (e.g., mouse, touchscreen, or similar) within the current slide window 603 or attendee slide window 613 enables the virtual cursor. Once the virtual cursor 621 is enabled, the delivery content server 104 makes the attendee view the active element and renders a virtual cursor in the current slide window 603 of the presenter view 601 at the same corresponding position of an attendee view cursor 622 in the attendee slide window 613 of the attendee view 602. In order to designate the enabled state of the virtual cursor, the content server 104 may change the virtual cursor 621 to a different color fill (e.g., orange) or shape (e.g., hand). The delivery content server 104 also hides the original system cursor 612 to avoid confusion with the virtual cursor 621.

At 1215, the delivery content server 104 tracks the attendee view cursor movement. This provides a cursor position synchronization between the attendee view cursor 622 and virtual cursor 621. In one implementation, cursor position synchronization may be achieved utilizing low level mouse hooks to track attendee view cursor movement. In one embodiment, each movement of the attendee view cursor 622 within the attendee slide window 613 is mirrored onto the virtual cursor 621 within the current slide window 603. Both content and cursor position are mirrored in real-time and provide a closed feedback loop between user input and the approved content rendering updates. This enables the presenter to control the attendee view 602 from the presenter view 601.

At 1217, determination is made if the attendee view cursor 622 moves outside the attendee slide window boundary 624. When this situation occurs, the virtual cursor is disabled and the delivery content server 104 pauses the cursor position synchronization. The approved content of the attendee slide window 613 is still mirrored into the current slide window 603. In one implementation, if the virtual cursor is enabled and the attendee view cursor 622 moves beyond the attendee slide window boundary 624, the delivery content server 104 may make the presenter view 601 the active element and conceals the virtual cursor 621 and attendee view cursor 622. The delivery content server 104 may also expose the original system cursor 612 and relocate the cursor 612 to just outside the corresponding mirrored position in the presenter view where the attendee view cursor 622 exited the attendee slide window boundary 624. This provides a seamless cursor transition for the presenter. After the attendee view cursor 622 moves outside the attendee slide window boundary 624, the process returns to 1213 to determine whether the virtual cursor is re-enabled.

At 1219, determination is made if the attendee view 602 is minimized. When this situation occurs, the virtual cursor is disabled and the delivery content server 104 pauses the cursor position synchronization. The delivery content server 104 also pauses the mirroring of approved content of the attendee slide window 613 into the current slide window

603. In one implementation, if the attendee view 602 is minimized, the delivery content server 104 may make the presenter view 601 the active element and conceals the virtual cursor 621 and attendee view cursor 622. The delivery content server 104 may also expose the original system cursor 612 and relocate the cursor 612 to a position in the presenter view. This provides a seamless cursor transition for the presenter. The pausing of cursor position synchronization and approved content mirroring is paused until the attendee view is restored or maximized. A message may be presented in the current slide window 603 to indicate the attendee view 602 is minimized. This ensures a presenter does not unknowingly proceed with the demonstration while the attendee is not engaged. After the attendee view 602 is restored, the process returns to 1213 to determine whether the virtual cursor is re-enabled.

The process ends at 1221.

While FIG. 12 is described in basic terms regarding its general operation as a virtual cursor used in conjunction with an interactive approved content delivery system, it should be appreciated that such a system is described with multiple specific implementations. Such specific implementations can be facilitated through front-end applications in the context of supporting research, development, and initial clinical trial submissions as previously described. Other front-end applications as previously described include manage access and/or distribution of trial documents and reports in support of ongoing clinical trials, materials control and/or manufacturing process controls, communications with medical facilities in support of medical facility operations, and the development and distribution of promotional materials as related to regulatory restricted products such as prescription drugs.

To facilitate the compliance with government regulation a regulatory compliance engine can be provided to review content and the access protocols and to ensure that only approved content authored by properly authorized individuals and according to required controls can be distributed to permitted possible customers or other content recipients in accordance with government regulations.

While various embodiments have been described above, it should be understood that they have been presented by way of example only, and not limitation. Thus, the breadth and scope of a preferred embodiment should not be limited by any of the above described exemplary embodiments, but should be defined only in accordance with the claims and their equivalents for any patent that issues claiming priority from the present provisional patent application.

Various terms used herein have special meanings within the present technical field. Whether a particular term should be construed as such a "term of art," depends on the context in which that term is used. "Connected to," "in communication with or other similar terms should generally be construed broadly to include situations both where communications and connections are direct between referenced elements or through one or more intermediaries between the referenced elements, including through the Internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time." "equivalent," "during," "complete," and the like should be understood to mean "substantially at the time." "substantially equivalent," "substantially during," "substantially complete," etc., where "substantially" means that such comparisons, measurements, and timings are practicable to accomplish the implicitly or expressly stated desired result.

The steps and/or operations described above in relation to an embodiment of the present disclosure may occur in a different order, or in parallel, or concurrently for different epochs, etc. depending on the specific embodiment and/or implementation, as would be understood by one of ordinary skill in the art. Different embodiments may perform actions in a different order or by different ways or means. As would be understood by one of ordinary skill in the art, some drawings are simplified representations of the actions performed, their descriptions herein simplified overviews, and real-world implementations would be much more complex, require more stages and/or components, and would also vary depending on the requirements of the particular implementation. Being simplified representations, these drawings do not show other required steps as these may be known and understood by one of ordinary skill in the art and may not be pertinent and/or helpful to the present description.

Similarly, some drawings are simplified block diagrams showing only pertinent components, and some of these components merely represent a function and/or operation well-known in the field, rather than an actual piece of hardware, as would be understood by one of ordinary skill in the art. In such cases, some or all of the components/modules may be implemented or provided in a variety and/or combinations of manners, such as at least partially firmware and/or hardware, including, but not limited to one or more application-specific integrated circuits ("ASICS"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a non-transitory computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques.

One or more processors, simple micro controllers, controllers, and the like, whether alone or in a multi-processing arrangement, may be employed to execute sequences of instructions stored on non-transitory computer-readable media to implement embodiments of the present disclosure. In some embodiments, hard-wired circuitry may be used in place of or in combination with software instructions. Thus, embodiments of the present disclosure are not limited to any specific combination of hardware circuitry, firmware, and/or software.

The term "computer-readable medium" as used herein refers to any medium that stores instructions which may be provided to a processor for execution. Such a medium may take many forms, including but not limited to, non-volatile and volatile media. Common forms of non-transitory computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium on which instructions which can be executed by a processor are stored.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field, such claims should not be limited by the language chosen under this heading to describe the so-called technical field. Further, a description of a technology in the "Background is not to be construed as an admission that technology is prior art to any invention(s) in this disclosure. Neither is the "Brief Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

The invention claimed is:

1. A computer-implemented method for virtual cursor facilitating delivery of interactive approved content in a content delivery system, comprising:
    establishing an attendee view window, wherein the attendee view window displays what is presented to an attendee including a presenter selected interactive approved content;
    establishing a presenter view window, wherein the presenter view window displays what is visible to the presenter only and includes additional tools to facilitate effective delivery of interactive approved content;
    overlapping the attendee view window and presenter view window with a compositing window manager that retains a first source resolution and a first frame rate;
    mirroring in real-time the presenter selected interactive approved content displayed in the attendee view window onto an area of the presenter view window such that approved content rendering updates are reflected in the area of the presenter view window;
    enabling a virtual cursor mode and displaying a virtual cursor on the presenter view window, wherein the virtual cursor position corresponds to a position of an attendee view cursor within the attendee view window; and
    designating the attendee view window as an active element and concealing a principal cursor.

2. The computer-implemented method of claim 1 above, further comprising:
    tracking the attendee view cursor movement and providing cursor position synchronization between the attendee view cursor on the attendee view window and the virtual cursor on the presenter view window.

3. The computer-implemented method of claim 1 above, wherein the attendee view window is output onto a first display and the presenter view window is output onto a second display.

4. The computer-implemented method of claim 1 above, wherein the attendee view window and the presenter view window are output onto a single display.

5. The computer-implemented method of claim 1 above, wherein the virtual cursor mode is enabled after detecting user input in the area within the presenter view window where the interactive approved content is mirrored.

6. The computer-implemented method of claim 1 above, wherein the virtual cursor mode is enabled after detecting user input in an area displaying the interactive approved content within the attendee view window.

7. The computer-implemented method of claim 1 above, further comprising:
    identifying when the attendee view cursor moves outside the displayed interactive approved content boundary;
    designating the presenter view window as the active element;
    disabling the virtual cursor mode; and
    concealing both the virtual cursor and the attendee view cursor.

8. The computer-implemented method of claim 7 above, further comprising:
    exposing the principal cursor and re-positioning the principal cursor to the presenter view window.

9. The computer-implemented method of claim 1 above, further comprising:
    identifying when the attendee view window is minimized and disabling the virtual cursor mode;
    designating the presenter view window as the active element; and
    concealing the virtual cursor and the attendee view cursor.

10. The computer-implemented method of claim 9 above, further comprising:
    exposing the principal cursor and re-positioning the principal cursor to the presenter view window.

11. The computer-implemented method of claim 9 above, further comprising:
    identifying when the attendee view window is maximized and enabling the virtual cursor mode;
    designating the attendee view window as the active element; and
    concealing the principal cursor and exposing the virtual cursor and attendee view cursor.

12. The computer-implemented method of 1 above, wherein the interactive approved content includes an interactive presentation.

13. The computer-implemented method of claim 1 above, wherein the interactive approved content includes an interactive document.

14. The computer-implemented method of claim 1 above, wherein the interactive approved content includes at least one of the following interactive features: using links to redirect to additional content, opening overlays, playing videos, displaying animations, zooming in, zooming out, and rotating images.

15. The computer-implemented method of claim 1 above, wherein the interactive approved content includes at least one of the following interactive features: manipulatable elements, combo boxes, drop down lists, text input fields, highlightable text, or menus that provide additional capabilities.

16. The computer-implemented method of claim 1 above, wherein the presenter view contains a section for current slide display, next slide preview, and slide tray.

17. The computer-implemented method of claim 1 above, wherein the virtual cursor in the enabled state is designated with a color fill or different shape.

18. The computer-implemented method of claim 1 above, further comprising:
   adjusting dimensions of the area of the presenter view window mirroring the user selected interactive approved content.

19. A system for virtual cursor facilitating delivery of interactive approved content, comprising:
   a content delivery server including a processor, the processor performing the steps of:
   establishing an attendee view window, wherein the attendee view window displays what is presented to the attendee including a presenter selected interactive approved content;
   establishing a presenter view window, wherein the presenter view window displays what is visible to the presenter only and includes additional tools to facilitate effective delivery of interactive approved content;
   overlapping the attendee view window and presenter view window with a compositing window manager that retains a first source resolution and a first frame rate;
   mirroring in real-time the presenter selected interactive approved content displayed in the attendee view window onto an area of the presenter view window such that approved content rendering updates are reflected in the area of the presenter view window;
   enabling a virtual cursor mode and displaying a virtual cursor on the presenter view window, wherein the virtual cursor position corresponds to a position of an attendee view cursor within the attendee view window; and
   designating the attendee view window as an active element, and concealing a principal cursor.

\* \* \* \* \*